United States Patent [19]

Bullions, III et al.

[11] 4,456,954
[45] Jun. 26, 1984

[54] VIRTUAL MACHINE SYSTEM WITH GUEST ARCHITECTURE EMULATION USING HARDWARE TLB'S FOR PLURAL LEVEL ADDRESS TRANSLATIONS

[75] Inventors: Robert J. Bullions, III; Thomas O. Curlee, III; Peter H. Gum, all of Poughkeepsie; Bruce L. McGilvray, Pleasant Valley; Ethel L. Richardson, Poughkeepsie, all of N.Y.

[73] Assignee: International Business Machines Corporation, Armonk, N.Y.

[21] Appl. No.: 273,532

[22] Filed: Jun. 15, 1981

[51] Int. Cl.³ ............................ G06F 9/44; G06F 9/32
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,241,401 | 8/1980 | De Ward et al. | 364/200 |
| 4,253,145 | 2/1981 | Goldberg | 364/200 |
| 4,279,014 | 7/1981 | Cassonnet et al. | 364/200 |
| 4,285,040 | 8/1981 | Carlson et al. | 364/200 |
| 4,347,565 | 8/1982 | Kaneda et al. | 364/200 |
| 4,351,024 | 9/1982 | Bradley et al. | 364/200 |
| 4,400,769 | 8/1983 | Kaneda et al. | 364/200 |

*Primary Examiner*—James D. Thomas
*Assistant Examiner*—Archie E. Williams, Jr.
*Attorney, Agent, or Firm*—Bernard M. Goldman

[57] ABSTRACT

Translation look aside buffer (TLB) hardware is provided in a central processor (CP) that receives the results of double-level address translations to eliminate the need for having shadow tables for the second-level in a virtual machine (VM) environment. Hardware is provided for indicating whether a requested address sent by the CP Instruction Execution (IE) unit for translation is a guest or host/native request, and for a guest request whether it is a real or virtual address. Intermediate translations for a double-level translation may or may not be inhibited from being loaded into the TLB. Guest entries may be purged from the TLB without disturbing any host entries. An accelerated preferred guest mode in the CP forces single-level translation hardware to translate each accelerated preferred guest request. A non-accelerated guest request may instead be translated by microcode. A limit check register is provided to check preferred guest addresses without causing performance degradation.

25 Claims, 20 Drawing Figures

FIG.3 (PAGEABLE GUEST MODE WITH ONE GUEST)
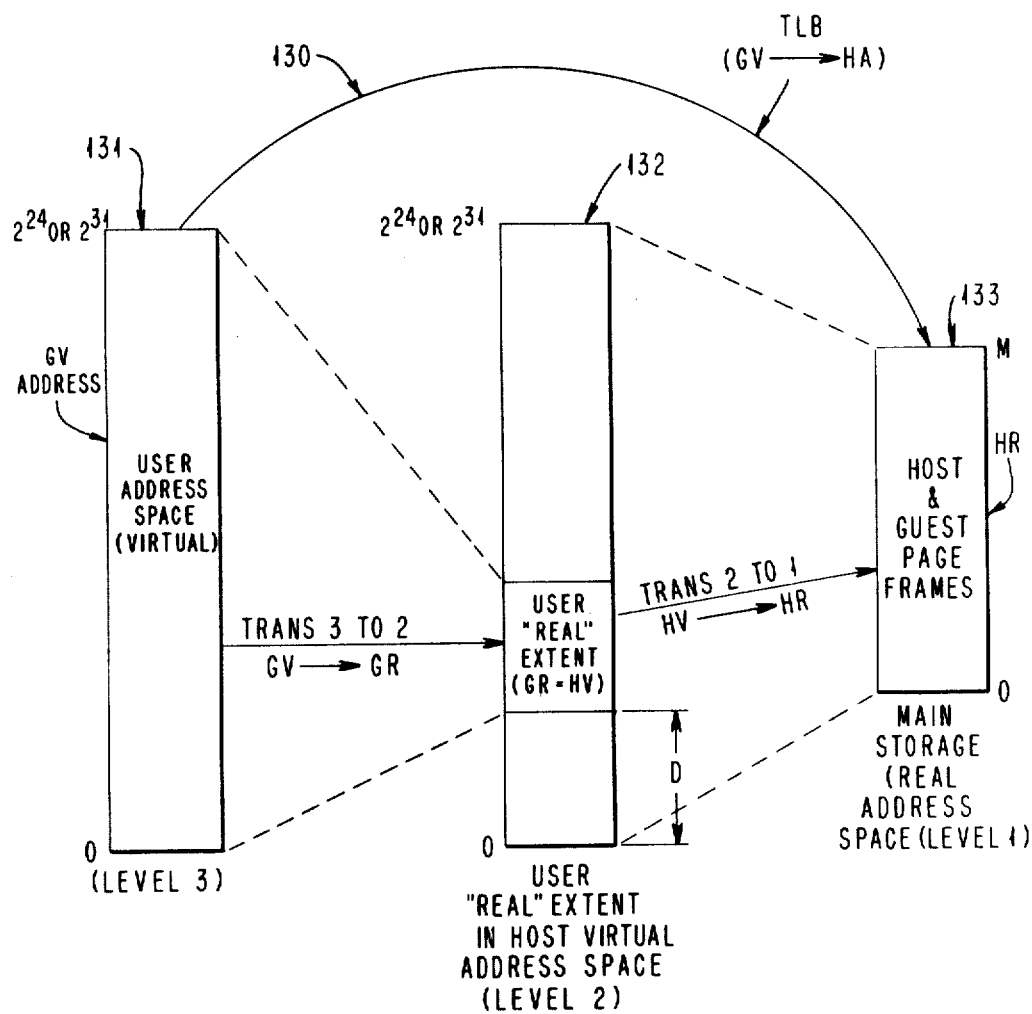

FIG. 4 (PAGEABLE GUEST MODE WITH PLURAL GUESTS)
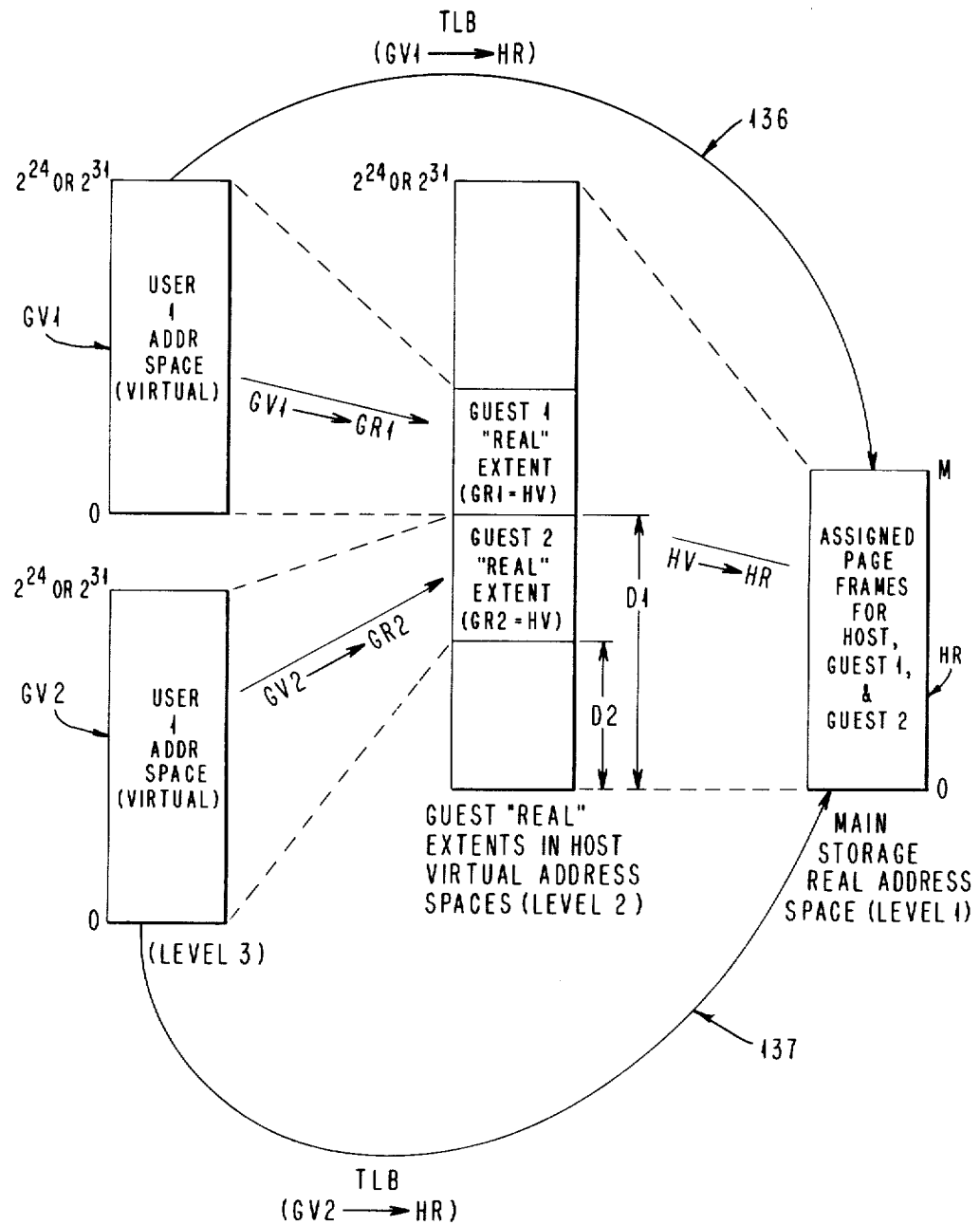

(PREFERRED GUEST MODE)

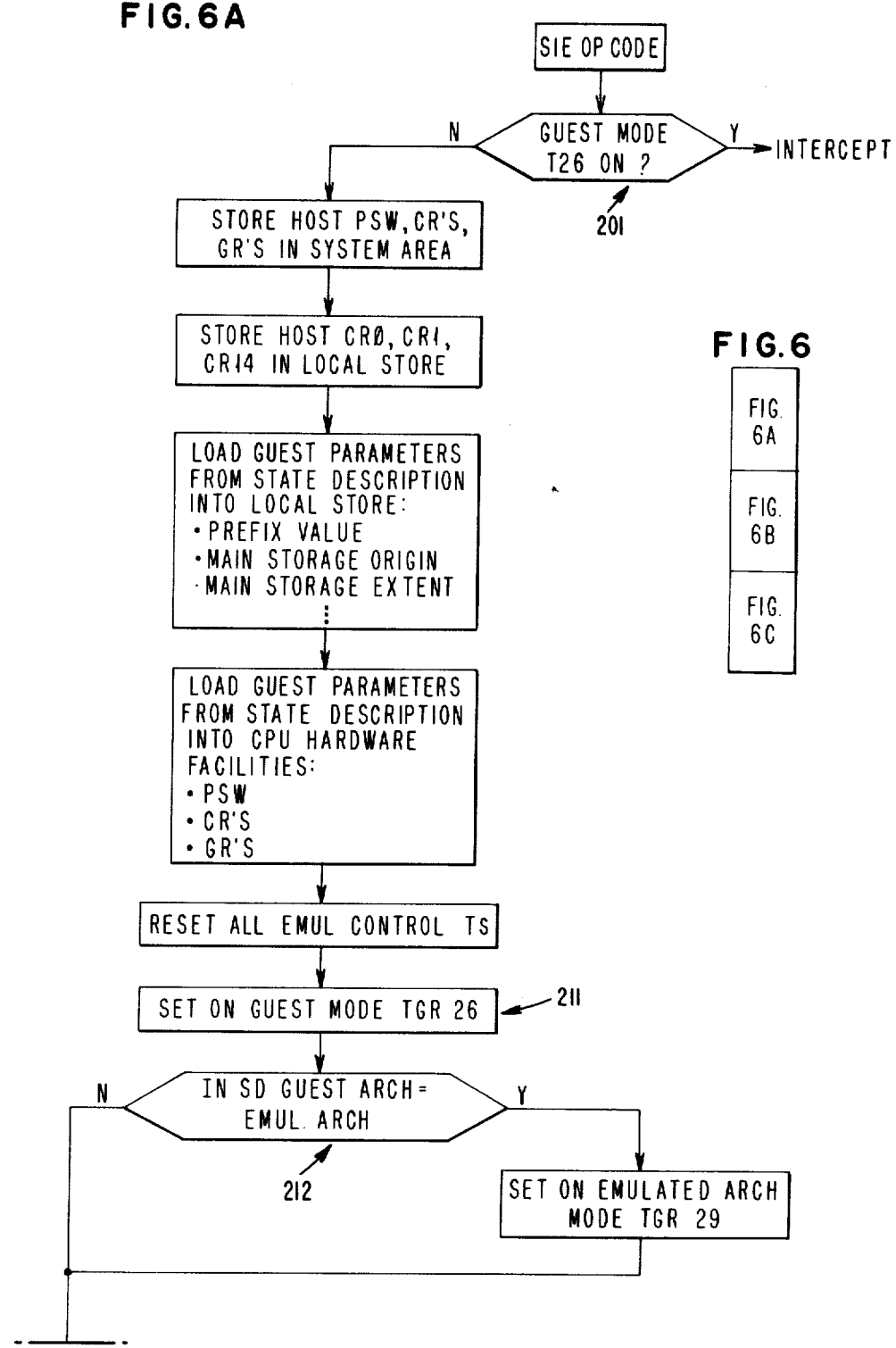

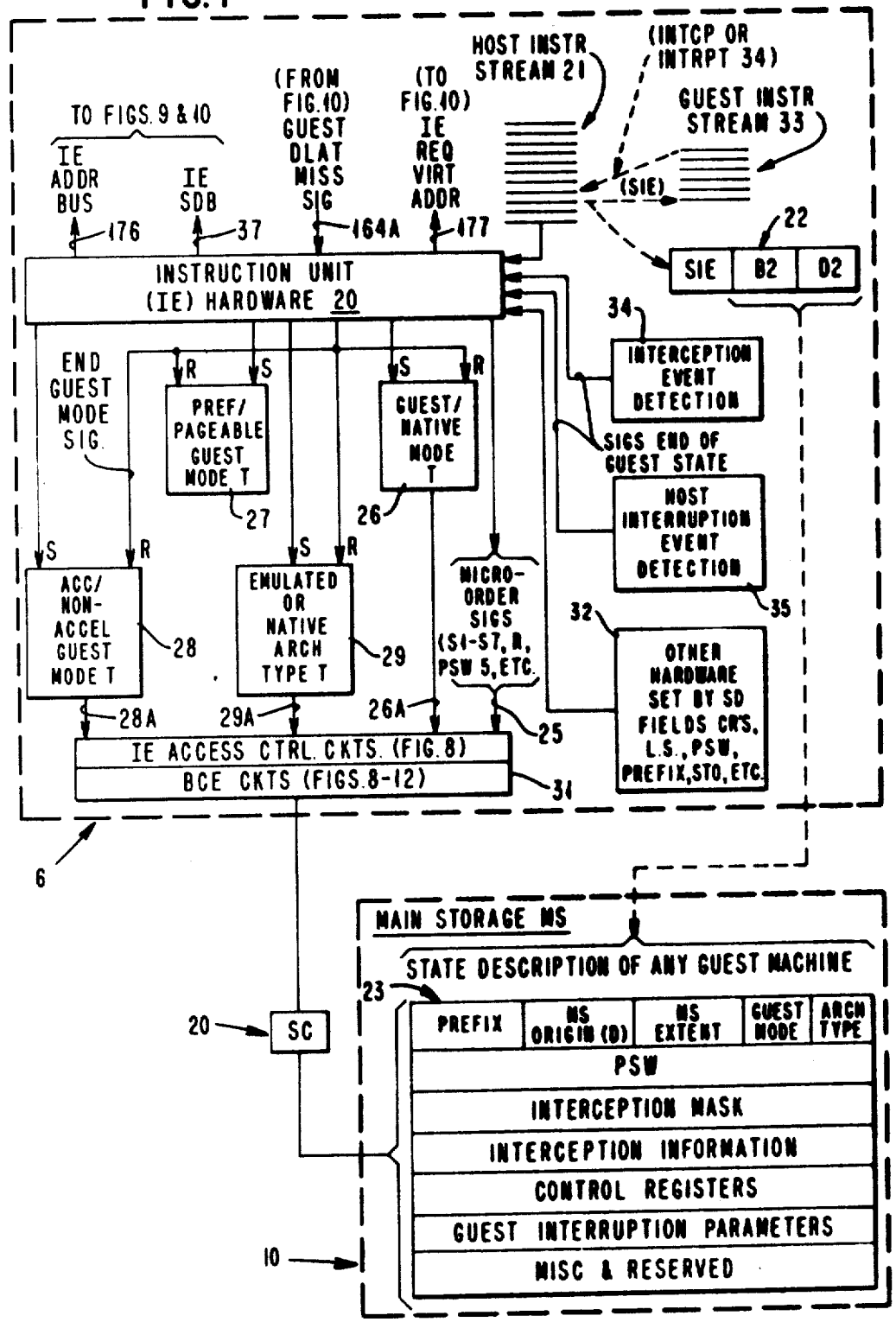

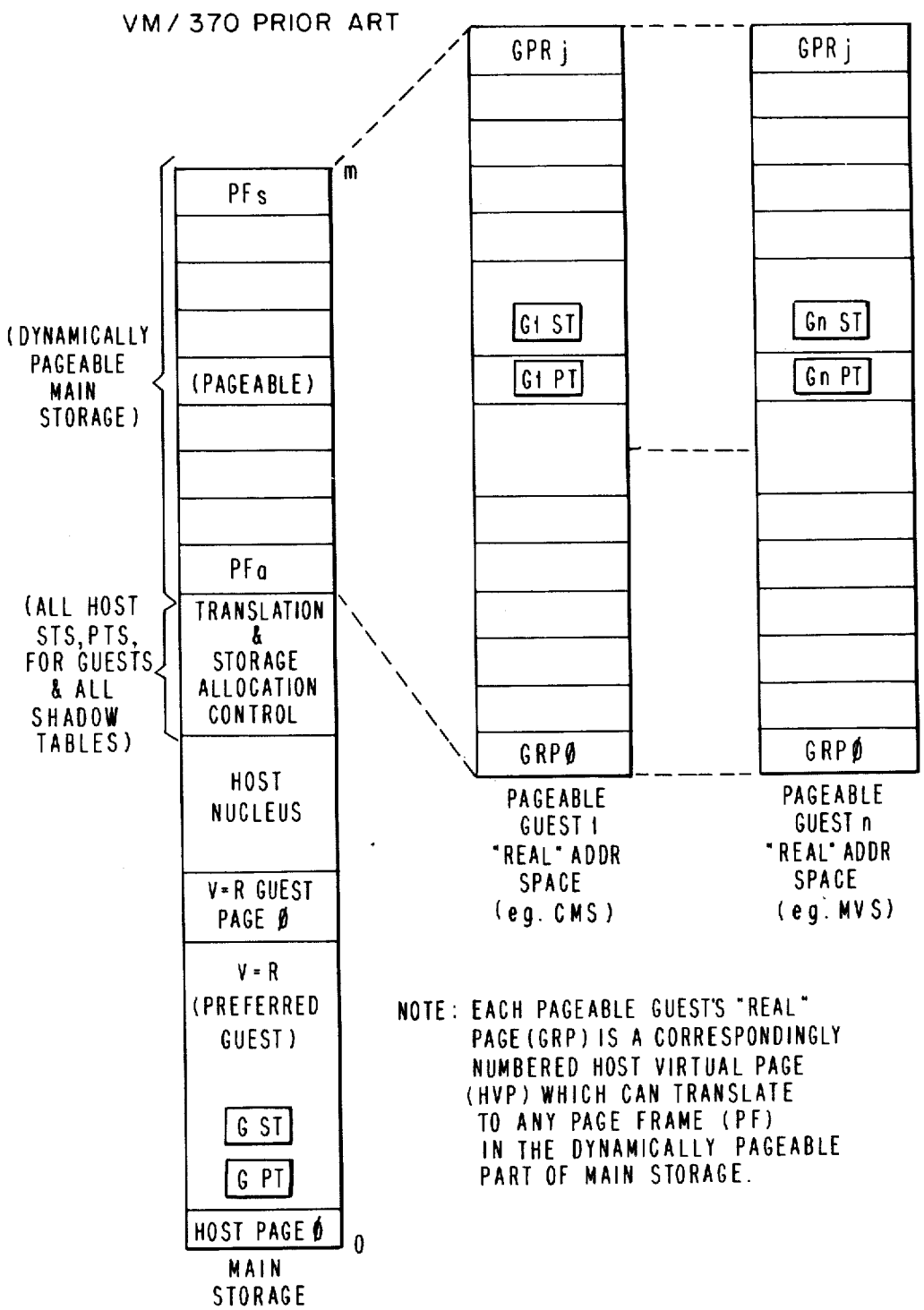
FIG. 14 VM/370 PRIOR ART

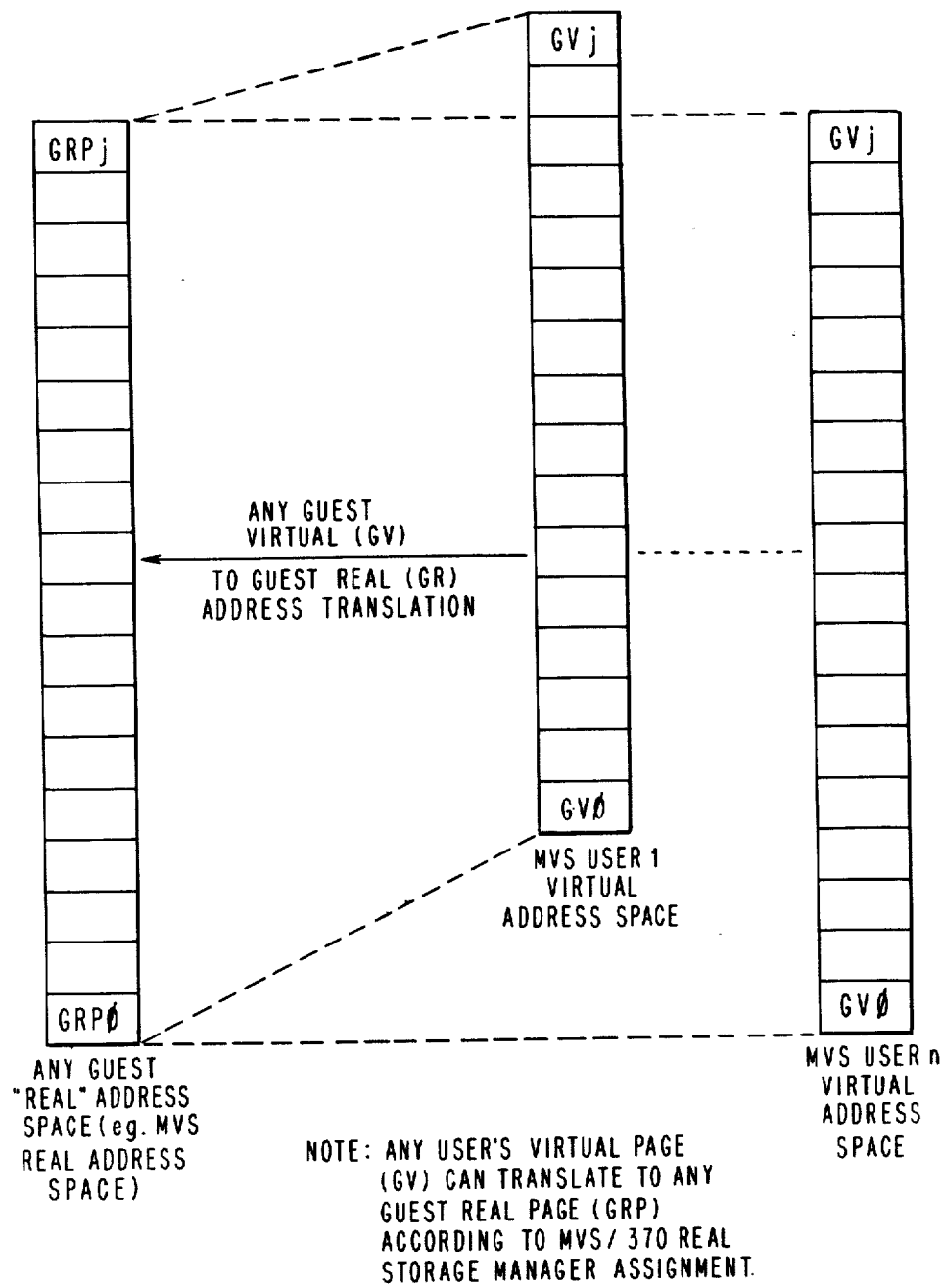
FIG. 15 VM/370 PRIOR ART

VIRTUAL MACHINE SYSTEM WITH GUEST ARCHITECTURE EMULATION USING HARDWARE TLB'S FOR PLURAL LEVEL ADDRESS TRANSLATIONS

A. FIELD OF THE INVENTION

This specification generally relates to efficient emulation of one or more guest architectures in a multi-programmable computer system to improve the performance of the system when executing plural levels of operating systems using plural levels of architecture. This invention obtains high performance operation of programs using guest computer architectures which may be the same as, or different from, the native architecture for which the data processing system is designed to obtain its most efficient execution of programs (i.e. best performance) without using emulation support.

This invention is particularly oriented to improving the performance of a virtual machine (VM) system using plural levels of architectures in which each architecture level is capable of using virtual addressing with dynamic address translation (DAT) with the resultant capability of having a user storage request require plural levels of DAT.

B. DESCRIPTION OF THE PRIOR ART

Many different computer architectures (e.g. IBM System/370, System/360, 7090, 1401, etc.) exist, each having substantial libraries of programs involving large monetary investments. On the other hand, any particular computer system has its optimum performance tailored to one hardware architecture, which is generally called its native architecture. Consequently, conventional computer systems which include modifications for emulating non-native architectures run the programs written for the non-native architectures less efficiently than programs running on the native architecture. Nevertheless, emulation means has been provided in the prior art on many prior commercial computer systems to enable a particular system to execute programs requiring a given foreign hardware architecture, even though such non-native architecture may run less efficiently (e.g. 1401 on a System/360 model), in order to avoid the high cost of reprogramming such existing programs to the native architecture of a particular computer system.

The situation is further complicated by having different operating systems designed to run on the same hardware architecture (e.g. VM/370, MVS/370, DOS/370, etc.), which cause operational incompatibilities among programs written to operate under the different operating systems, even though they operate under the same hardware architecture (e.g. use of the same set of machine instructions and machine facilities). For example, a program written to operate under DOS/370 may not necessarily be operational under MVS/370, even though both programs use the machine instructions of the S/370 architecture. One reason is that application programs often rely on special control programming facilities, e.g. program inclusion of special macroinstructions, job control language statements, etc., provided by a particular operating system to ease the program design burden, but the special facilities may make the program dependent upon the particular operating system.

The situation is further complicated by the economic need to share an expensive computer system among a large number of users in a manner which makes the computer system appear to each user as if that user has all (or a substantial part) of the facilities of the system. This problem has found a solution in current commercial interactive multiprogramming systems such as the IBM VM/370 and MVS/370 (using TSO) operating systems. The existing VM/370 system has the advantage of being able to simulate (by its software) multilevels of architecture, so that its users can concurrently and relatively efficiently execute programs written for any of the different operating systems (e.g. MVS, DOS, VM, etc.) which use the System/370 or System/360 hardware architecture.

A further complicating factor is the virtual address translation found in a hardware architecture, such as IBM System/370 which provides a virtual addressing architecture to simplify user program writing by eliminating the need for the user to control the use of real storage space, as is essential in nonvirtual machines, i.e. System/360 or System/370 with DAT off.

Further difficulty is caused when two levels of DAT architecture are used. This occurs, for example, when a VM/370 system permits a user program to execute on one operating system (e.g. MVS/370) running on a second level System/370 architecture which is being emulated under a first level System/370 architecture running another operating system (e.g. VM/CP), in which both operating systems have DAT on to require two levels of address translation to translate each address requested by the user program in order to access the requested data in main storage. Such double-level translation increases the translation overhead in comparison to running the same user program under only a single level of operation system. For example, the double-level translation of a single request involves eight accesses of segment and page tables in main storage, in comparison to a single-level translation which involves only two main storage accesses (i.e. one segment table entry and one page table entry).

Since the System/370 hardware on which the VM/370 System was run did not provide for double-level address translation, software constructed shadow translation tables when a second level operating system was using DAT. Shadow translation tables provided a method to allow the System/370 hardware to translate second level virtual addresses by using a standard two-reference translation. If a page fault, or segment fault occurred in the shadow translation tables, software would be notified, by a standard DAT fault, of the condition, and software would fill in the correct shadow table entry by performing a double-level address translation. There was one shadow translation table constructed for each user which was using DAT.

The use of System/370 dynamic address translation architecture by the VM/370 control program to represent two levels of translation is described in "VM/370 Data Areas and Control Block Logic" Form No. SY20-0884 published on Feb. 16, 1976, and in "VM/370: System Logic and Problem Determination Guide, Volume 1 (CP Component)" Form No. SY20-0886 published on Mar. 3, 1977.

Each shadow table uses the standard format of segment and page tables. The shadow table for each user receives the results of each double-level translation by the guest (i.e. the corresponding page frame absolute address for the requested virtual address), and thereafter allows the next request by the same user to the same page frame in main storage to be obtained with only a single-level translation, as long as that entry is not purged from the shadow table. The shadow tables for a user include a shadow segment table and one or more shadow page tables in main storage. The shadow tables are used like a translation look-aside buffer (TLB). Each user request is first made to the user's shadow table, because if the request is found in the shadow table only two main storage accesses were required to obtain the resultant main storage address for the user requested data. Only if the user requested address was not found in his shadow tables did the software need to perform double-level translation, then put the resultant translation into the required shadow table entry for subsequent use.

Therefore, the shadow tables reduce the number of main storage accesses from eight to two for the second and later requests for the address of the same page frame, as long as the entry is not purged from the user's shadow table. The shadow table TLB is effectively an extension of the hardware TLB found in the commercial large IBM CPU's. The hardware TLB (also called DLAT) does not require any main storage access when obtaining the address for additional requests to the same page frame. Unfortunately, the prior DLATs could only contain single-level address translations communicated by the single-level hardware DAT in the CPU. Thus, a request found in a shadow table by means of a singlelevel DAT translation was then put into the DLAT, so that the third request to a page frame would obtain its translated address from the DLAT without further main storage accesses. However, some of the preceeding main storage accesses (e.g. eight for a double-level translation and two for a single-level shadow table translation) caused entries to be put into the DLAT which would not be used in the DLAT and had the undesirable effect of destroying DLAT entries which had a significant likelihood of future use.

In VM/370, a user's shadow tables are often purged whenever any page frame in guest main storage is invalidated by the guest. The reason selective page entry invalidation was not done in the shadow tables is because it involved excessive software overhead in comparison to purging all shadow page tables, since selective page invalidation would need to search all guest page tables for each page being eliminated from main storage. Therefore, in a VM/370 system, all shadow tables could be purged at a relatively high frequency which may result in additional double-level translation overhead if the restoration of many of the purged entries is again requested.

The wide versatility in the services provided by a VM system make it attractive to system users, who need not be aware of the internal double-level address translations occurring in the operating system software within the VM system. A significant performance improvement in the IBM VM/370 operating system was obtained in 1974 in many IBM System/370 model machines when the virtual machine assist (VMA) microcode was released. Among other things, VMA provided a marked reduction in the software overhead in the filling-in of shadow table entries by providing the double-level address translation in microcode in many cases, rather than requiring software intervention. The process in microcode was identical to that of software, except that software interruption handling and status saving and restoring was not required.

Also in the prior IBM VM/370 system is the special case of a V=R guest (also called the preferred guest, or reserved storage, or selected guest). In the special case of the shadow table bypass mode, only single-level translations are used, even though the preferred guest is operating at the second architectural level in the system. This is done by assigning the preferred guest to a predetermined low-address extent of main storage, in which the guest translated real addresses map directly into that extent. In particular, dynamically modified System/360 and System/370 I/O channel programs can be run by the preferred guest which cannot be used by pageable guests using double-level translation.

However, in the shadow-table bypass mode, the preferred guest addresses are no longer validated by the host program, because the host is not required to construct the preferred guest shadow tables. As a consequence, erroneous preferred guest store addresses can damage the host programs. To maintain host integrity under these circumstances (except with respect to I/O), the bypass mode is not used and the host uses shadow tables for the preferred guest to limit all storage accesses by the preferred guest CPU to the preferred guest's extent.

Even when the shadow table bypass mode is used, the host must modify a guest page table to avoid conflict with the host absolute page zero which may be used for the host's prefixed page. With both the bypass mode and the shadow table mode, the translation tables are used to translate references to guest real page zero (to give one effect of prefixing), which is needed in VM/370 on a uniprocessor as well as on a MP to avoid a conflicting use of absolute page zero by both the host and guest.

The host retains the remaining part of the main storage above the preferred guest's extent. A section of the retained part of main storage is directly used by the host in which the host operating system can run in either DAT or real addressing mode; and the remaining part is available for use by pageable guests in which the host provides a shadow-table for each user using double-level translations.

In summary, shadow tables protect the host main storage from stray store accesses by any guest CPU using shadow tables, because the host constructs the shadow tables and thereby assures itself that the corresponding guest is restricted to its host assigned part of main storage. The use of shadow tables for preferred guests at the second level in the system provides host integrity in relation to all pageable guests requiring double-level translations. When the preferred guest at the second level is permitted to use the shadow table bypass mode to avoid the overhead of double-level translations, the host loses integrity in relation to the preferred guest since no shadow tables are then used to monitor the guest accesses to main storage, which leaves open the possibility that the preferred guest could store into the host's area of main storage and disrupt the operation of the VM/370 system.

Other prior art which appears to suggest the equivalent of the prior shadow page tables may be the HV associator discussed in column 23 of U.S. Pat. No. 4,253,145 to R. P. Goldberg. Other limitations described in the claims of U.S. Pat. No. 4,253,145 are that they only apply to: (1) virtual machines (VMs) which are duplicates of the host machine, and (2) VMs which have a recursive relationship to the host machine. The subject invention does not require either duplicate or recursive relationships between the host and its virtual machines.

A Harvard University Thesis dated October 1972 by R. P. Goldberg entitled "Architectural Principles for Virtual Computer Systems" provides an algorithmic/-mathematical description of a "Hardware Virtualizer (HV) which is generally described without any specific implementation and is to be providable in hardware and firmware (microcode). The thesis and U.S. Pat. No. 4,253,145 cause each level in a VM system to have its own f-map. The f-map operates across one VM level (i.e. n+1 to n), unlike a shadow table which can operate across two or more levels in a VM system. Thus, Goldberg's VM system has a large number of f-maps that simultaneously exist in a large multi-level system. Each entry in a HV relates the segment number, page number of a level (n+1) address to a level n address (in the next lower level), and has a validity status bit.

SUMMARY OF THE INVENTION

The advantages and objects of this invention are:

1. To improve the performance of a computer system while it is executing host and guest programs operating under plural levels of architecture in a virtual machine system which may involve plural levels of address translation. For example, the different architectures may use different size addresses, e.g. one architecture may use 24 bit addresses while another architecture may use 31 bit addresses.

2. To provide uniformly good performance of a computer system for different kinds of guest operating systems, e.g. DOS/370, VM/370, MVS/370, etc. The reduction by this invention is from one software TLB per process or user (usually involving a large number of software TLBs in the system) to no software TLBs in the VM system.

3. To modify the one hardware TLB per central processor in the system and use the hardware TLB to eliminate the need for the prior software TLBs. Thus in a uniprocessor VM system, only one hardware TLB and no software TLBs may be required, regardless of the number of VMs, processes or users in the system.

4. To improve the performance of a computer system while it is executing a user program using virtual address translation controlled by an operating system running on a second-level emulated or native architecture which is being run under a first-level native architecture on which another operating system also is using virtual address translation, in which both levels share the same hardware machine.

5. To eliminate the need for the shadow segment and page table type of software TLBs, while obtaining an increase in system performance greater than is obtainable with shadow tables when using double-level translations.

6. To eliminate all main storage accesses after a double-level translation, in order to directly obtain the result of the double-level translation.

7. To provide a hardware TLB which can communicate directly with a double-level translation operation.

8. To provide a novel hardware TLB means which can be shared by guest and host architecture programs which use either single level translations or double-level translation.

9. To provide controls for a hardware TLB for storing a condensed double-level translation into an entry addressable by the guest requested virtual address represented in the entry.

10. To provide a hardware TLB which may contain double-level translation entries and the entire TLB is not purged whenever any guest page is invalidated or paged out of main storage.

11. To provide a hardware TLB with controls for the selective purging of a particular double-level translation entry representing an invalidated guest page in main storage without affecting other TLB entries.

12. To provide means in a hardware TLB for selectively purging all translation entries relating to an intercepted or interrupted guest program without purging other entries in the TLB relating to the host program operation.

13. To provide load inhibit controls with a hardware TLB for inhibiting the loading into the TLB of some interim single-level translation results occurring within a double-level translation operation, in order to avoid allowing interim entries from destroying existing valid TLB entries, which could decrease system performance by subsequent retranslations of such destroyed entries, and which could create a deadlock situation for instructions with at least two storage operands when the hardware TLB does not have more than two-way set associativity.

14. To perform any double-level translation of a requested virtual address and to store the resulting main storage address into a hardware TLB entry assigned to the requested virtual address.

15. To select either the guest STO (segment table origin address in main storage) or the host STO for being stored into the TLB entry assigned to a request, in accordance with the request being by a guest program or by the host program.

16. To provide acceleration means with a hardware TLB for enabling a preferred guest using virtual addressing to use the single-level hardware DAT circuits associated with the TLB to perform all translations for the preferred guest.

17. To provide limit checking means to check preferred guest translated addresses against an upper limit main storage address to determine if each preferred guest request is within the extent assigned to the preferred guest to obtain host integrity against preferred guest operation without any system performance degradation, in comparison to the large system performance degradation caused by the prior art technique of requiring the preferred guest to use shadow tables to protect the host integrity.

18. To provide prefix switching between host and accelerated guest prefix values in the processor's prefix register to eliminate the need for the more costly technique of using a guest's page table entry to simulate prefixing for the guest while permanently leaving the host prefix value in the processor's prefix register.

BRIEF DESCRIPTION OF THE DRAWINGS

FIGS. 1, 14 and 15 illustrate the host/guest relationship found within the prior IBM VM/370 system.

FIGS. 2, and 2A and 2B represents the double translation operation required of a guest virtual address.

FIGS. 3, 4 and 5 illustrate address space and translation relationships found with various GUEST modes of operation useable within the invention.

FIG. 3 illustrates the pageable guest mode with one guest. FIG. 4 illustrates the pageable guest mode with plural guests. FIG. 5 illustrates the preferred guest mode.

FIGS. 6A, 6B and 6C diagrammatically show an execution flow for the SIE (start interpretation execution) instruction.

FIG. 7 represents the interaction between an executing host program calling a guest program in relation to the microcode, hardware and main storage of the central processor executing program.

BACKGROUND OF THE INVENTION

Figure 1:
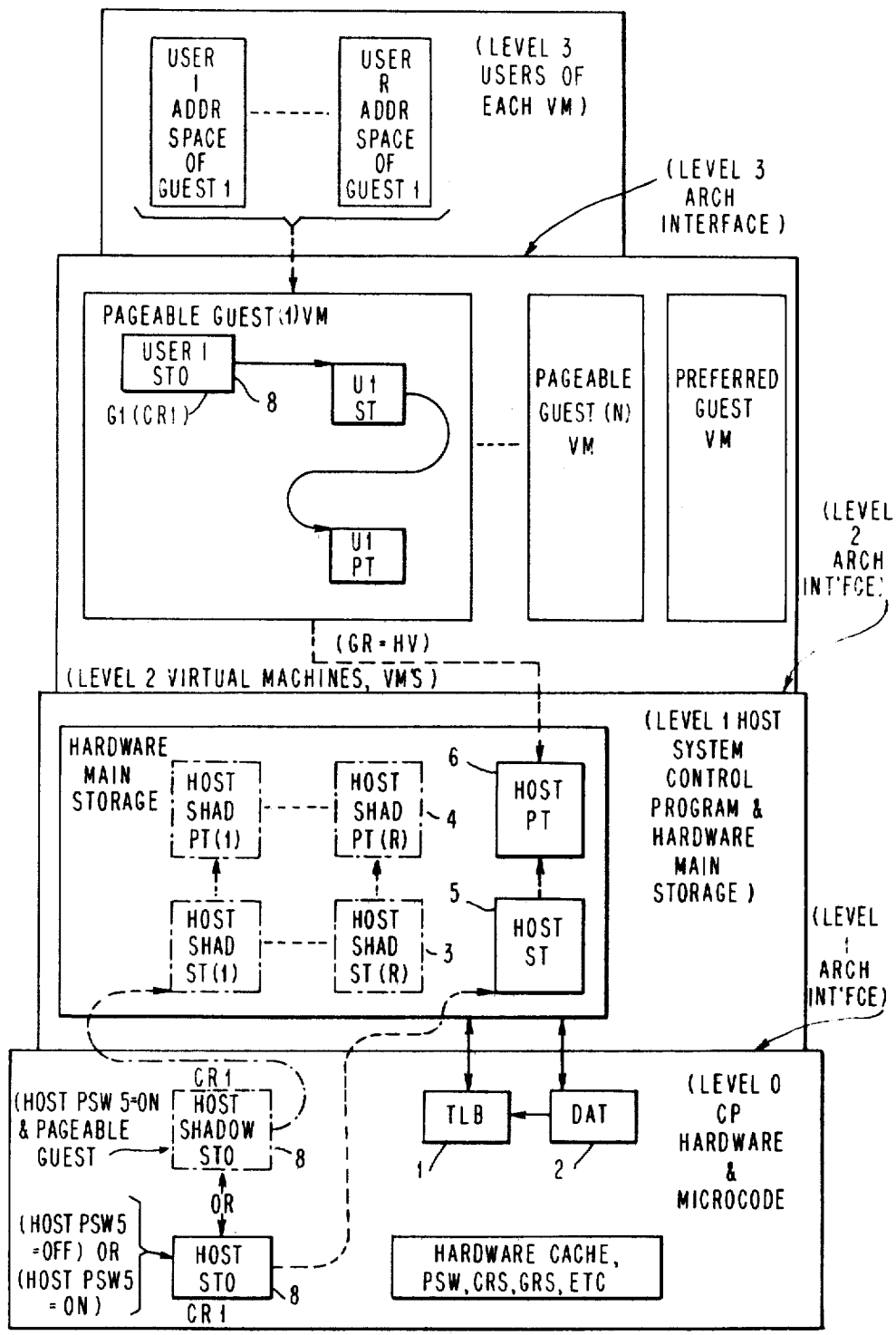

FIG. 1 illustrates the structure of a virtual machine (VM) system, like the commercial IBM VM/370 operating system in the prior art which is a software system having a microcode assist in various IBM System/370 Models 158, 168 and 3033. The items illustrated by broken lines in FIG. 1 represent items removed from VM/370 by the subject invention, which involves the elimination of the plurality of shadow-tables shown in broken lines. The prior VM/370 system provides multilevel operation of architectures of the System/370 and System/360 type and allows different operating systems (such as MVS/370, DOS/370) to operate under the respective architectures provided at the different levels within a single VM/370 system. In FIG. 1, the lowest level 0 represents the hardware and microcode CP machine supporting the VM/370 system, and level 0 hardware includes dynamic address translation (DAT) and translation lookaside buffer (TLB) hardware and microcode supporting virtual storage in the operation of the machine under any of the plurality of related architectures including the System/360, System/370 and System/370 extended architectures. The TLB hardware 1 receives each address translation performed by the DAT hardware 2, and the translation remains in an entry in the TLB as long as the entry space occupied by the translation is not required by some new translation. In current commercial large IBM System/370 systems, the TLB is a set-associative congruence class type of TLB in which each requested address locates a congruence class in the TLB in which the contained entries are associatively tested. For example each class may contain two separate entries to provide two-way set associativity in the manner well known in the art.

Level 1 in FIG. 1 contains the host system control program (SCP) and the host translation tables used by the SCP comprising the host's segment table (ST) 5, and its related page tables (PTs) 6 along with a plurality of host shadow tables 1 through R shown in broken lines. There is one shadow table for each user 1 through R at level 3.

The shadow tables 1 through R are used by the host program as TLBs for double-level translations of user virtual addresses into main storage addresses.

The host also has translation tables 5 and 6 for translating second-level virtual addresses (guest "real", also host virtual) in the address space into main storage addresses.

The host machine is the real hardware machine at level 0, which has the level 1 architectural interface that is used by the host system control program (SCP) which, for example, may be the control program of a VM/370 type of system. The host program directly controls the hardware machine using the level 1 architecture. The real machine at level 0 in VM/370 has (1) a native architecture and (2) only limited capability to emulate other similar architectures. The host program uses the native architecture, e.g. System/370. Any guest may use the native architecture as well as any other available architecture. The particular architecture used by any guest is specified by the host in a software control block. The VM/370 host mays run with dynamic address translation (DAT) off, in which the host requested addresses are handled as real addresses, and accordingly are interpreted by the storage controller in the hardware machine for accessing absolute addresses in main storage, i.e. the hardware adds prefixing if the CPU is in an MP (multiprocessor).

Guest virtual machines (VMs) in the system operate at the level 2 architectural interface in FIG. 1. Each guest VM may choose its own operating system (OS) program which then executes at the level 2 architectural interface. Each guest VM appears to its using programs as a complete system having an assigned set of resources described for each VM in a host's system directory, which contains the name of the owner of each VM, the amount of "real" storage allocated to each VM in the host address space, and other information about each VM. Each guest also has its own simulated control "hardware", such as control registers, and a PSW. A guest VM may operate with either the DAT off or on in relation to its "real" storage. For example, any level 2 guest VM may use the MVS/370 operating system to support a plurality of users at a next higher level 3 when its users require the guest VM to run with DAT on in the simulated PSW of the related level 2 guest.

In FIG. 1, a plurality of the guests 1 through n are pageable guests, and guest (n+1) is a "preferred" guest.

The pageable guest VM's are each assigned a "real" storage which is a respective extent in a host virtual storage space. Pageable guest VMs are therefore paged into the system's absolute main storage using the host translation tables 5 and 6 on a demand basis. Any pageable guest may operate with its PSW DAT state off or on, depending on whether the pageable guest allows its users to directly manage the respective user assigned "real" storage. For example, a guest operating system like MVS/370 can manage its users "real" storage in the guest's "real" storage by providing each user with its own virtual address space which also provides isolation among its users.

FIG. 14 shows the address mapping within VM/370 of any guest's "real" address space into the host main storage. FIG. 15 shows the address mapping within VM/370 of any user virtual address space into its related guest's "real" address space, which then maps as shown in FIG. 1 into main storage.

One user in the VM system may be selected as a "preferred" guest at level 2 by assigning the preferred guest the lowest part of the host's absolute main storage, instead of a part of a host virtual storage space as is done for pageable guests. This requires that the host initially allocate to the preferred guest a predetermined extent of contiguous main storage beginning at absolute address zero, which extent (except for the first page frame) is not thereafter available for use by the host or any other guest. The preferred guest is given the entire responsibility for suballocation and management of main storage within this extent and does not use the storage management facilities of the host. The preferred guest may operate with its PSW DAT state either off or on. When certain special optional modes of operation are selected, instruction and operand addresses are directly handled as real main storage addresses. In some cases, when the preferred guest's DAT is on, the preferred guest's addresses are translated by the preferred guest's ST and PTs directly into the guest's extent in main storage. The guest's tables in some cases are minimally modified by the host program. When dispatched, the preferred guest's STO is put directly into CR1 8 in FIG. 1 to access the preferred guest's translation tables, so that the preferred guest's translated addresses are directly provided into the guest's extent in main storage for accessing its data and instructions using only single-level address translation, which is more efficient than the double-level address translation required by level 3 users.

The level 3 architectural interface is controlled by a related level 2 guest VM, and it may be the same as or different from the architectural interface seen by the level 3 users of other level 2 guests. Thus, each set of level 3 users relate to a particular level 2 guest VM which has its own SCP which may be the same or different from the SCP being used by any other level 2 guest VMs. For example, guest 1 at level 2 may use the MVS/370 SCP to support a plurality of users 1 through R, each having its own virtual address space at level 3.

In more detail, each level 3 user has its own set of translation tables to translate its own level 3 address space into its assigned "real" storage in its related guest's virtual address space at level 2. Also for each level 3 user, the level 1 host has a corresponding set of shadow tables (e.g. 3 and 4) in main storage which are used by the host as a TLB for handling the respective level 3 user address requests in the host controlled main storage. For example, if guest 1 at level 2 is using the MVS/370 SCP to support users 1 through R in level 3, then if user 1 is dispatched by MVS, STO1.1 (which is the STO for user 1 of guest 1) is fetched by MVS from the guest 1 "real" storage and transferred into the simulated guest 1 CR1, (i.e. G1 (CR1)) to control the address translation for user 1 by means of its own translation tables U1 (ST) and U1 (PT).

Each entry in U1 (ST) is capable of containing a user's page table origin (PTO) "real" address which locates a user's page table U1 (PT) in the guest's "real" storage. Each U1 (PT) entry may be assigned a page frame "real" address (PFRA) to locate an assigned "page frame" in the guest's "real" storage, which is part of the host's virtual storage, as previously mentioned.

The translated PFRA output of U1 (PT) is a pageable guest 1 "real" address which, thus far, involves only a single level of the translation into the guest 1 virtual address space at level 2, which also is a host virtual address space. The resultant user 1 "real" address maps therefore into an assigned page in the host's virtual storage and is received by the host VM as a virtual address request from guest 1, which still must be translated by the host VM to the required main storage location. This host translation is controlled by the host STO in CR1 8 with the host DAT on, which addresses the host ST5 and accesses a host PT6 to obtain the next translation level for the user's requested address.

The guest and host translation tables therefore provide two levels of address translation, which involve a total of eight accesses to main storage to translate a single MVS user address request into its main storage real address. This address translation process is shown in detail in FIGS. 2A and 2B for a user requested virtual address 110A. The following legend is used in FIG. 2:

LEGEND

Figure 2A:
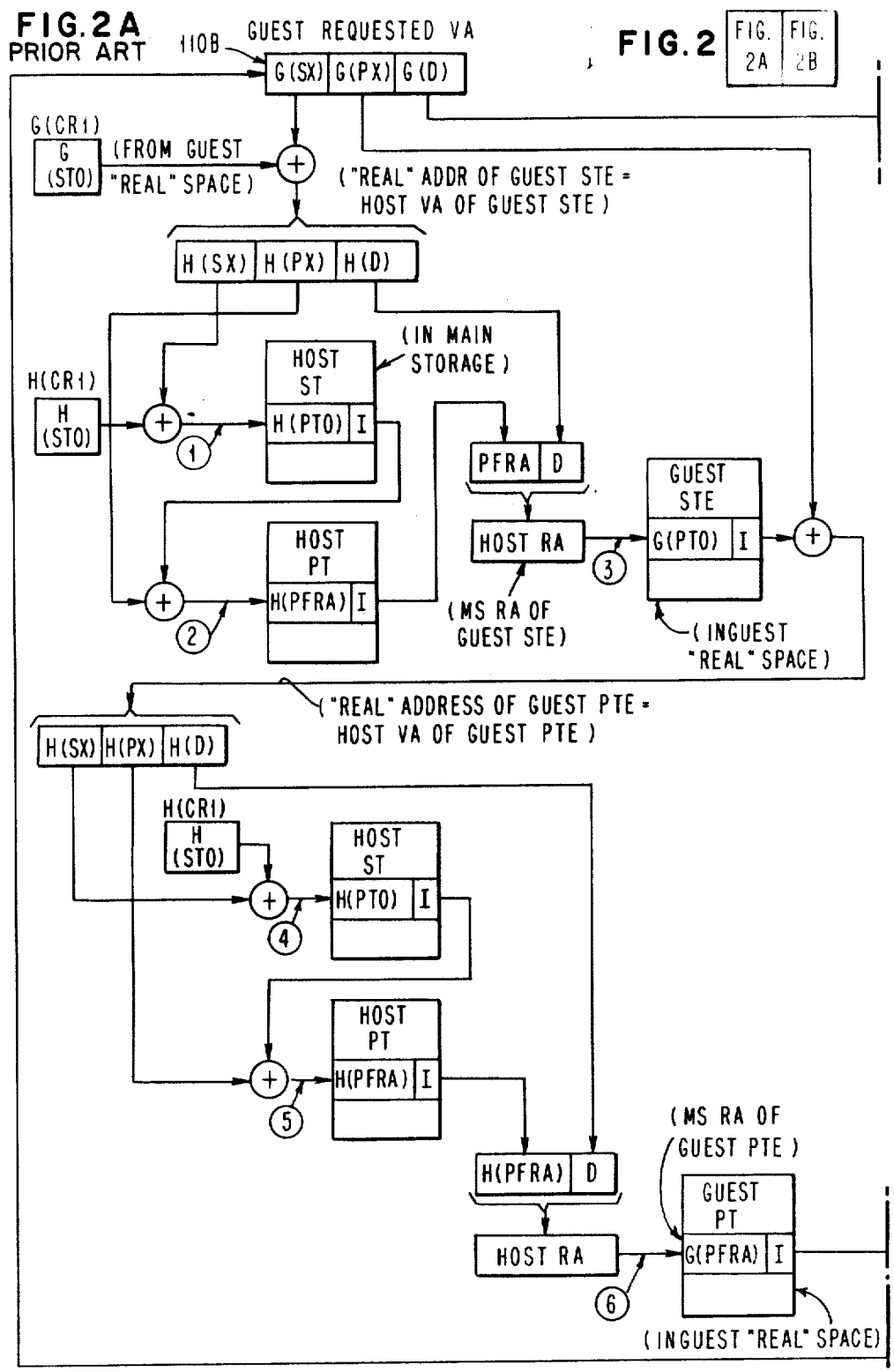
Figure 2B:
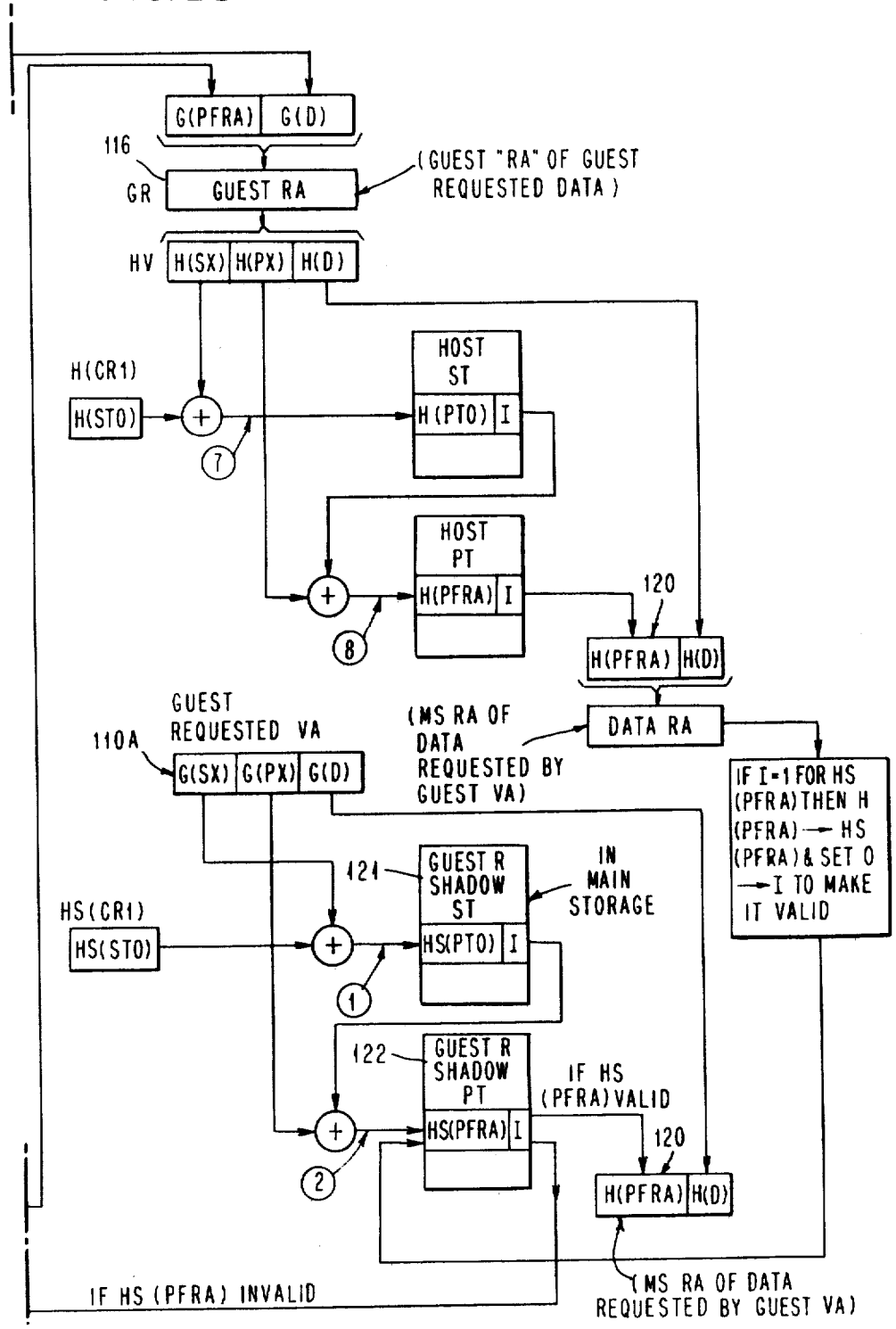

VA = Virtual Address
RA = Real Address
SX = Segment Index
PX = Page Index
D = Byte Displacement in Page
G = Guest
H = Host
HS = Host Shadow Tables
STE = Segment Table Entry
PTE = Page Table Entry
STO = Segment Table Origin
PTO = Page Table Origin
PFRA = Page Frame Real Address Each circled number in FIGS. 2A and 2B represents a main storage access in the sequence in which they occur during the translation of address 110A. It is seen in FIG. 2A that the first six main storage accesses are required during the first-level translation (at level 2) to translate the user's requested address 110A into its "real" address 116, which is in the host virtual address space. That is, the user's "real" address 116 (i.e. the guest real (GR) address) is then presented to the host which the host considers a host virtual (HV) address which requires two more main storage accesses by the host second-level translation (at level 1) to obtain the corresponding host real (HR) address 120 for the requested user data in real main storage.

Therefore, the described double-level translation involves eight main storage accesses for each user address request 110A, which involves a very significant amount of performance overhead for the system. This overhead has been reduced by providing the host with another set of tables (e.g. shadow tables 3 and 4 in FIG. 1) for each user having its PSW DAT on (which causes a double-level translation).

On the completion of any double-level translation, the resultant page frame real address (PFRA) in main storage is inserted into a corresponding entry in the guest's shadow page table 122 in FIG. 2. Shadow ST 121 and PT 122 are also shown in FIG. 1 as the shadow tables 3 and 4 in host level 1 associated with user n in level 3.

The shadow tables 121 and 122 thus represent a translation lookaside buffer for requests by the respective user to obtain a previously doubletranslated page address (i.e. user request 110) with only two main storage accesses, i.e. to ST 121 and PT 122.

The double-level translation and shadow table accessing algorithms described in FIGS. 2A and 2B are presently implemented in the prior art by VMA microcode in the IBM System/370 Models 135, 158, 168 and 3033. They are described in a prior publication: IBM Technical Report TR00.2506 entitled "Virtual Machine Assist Feature Architectural Description" by P. H. Tallman et al dated Jan. 9, 1974. Each shadow PT contains the same number of entries as the associated user's level 2 PT; but the entries in the corresponding shadow PT contain the double-level translation value from level 3 to level 1, while the corresponding entries in the user's PT contain only the user's single level translations from level 3 to level 2, which are different values.

When any CPU operates with the VMA assist microcode, a request by a level 3 user first causes the host to access the machine TLB. A miss in the machine TLB causes the respective user shadow tables to be accessed in the standard manner (requiring two main storage accesses) to determine if they contain the required translation. For example, a request for address 110B in FIG. 2B by user 1 for an operand first causes the machine TLB to be interrogated. When the machine TLB does not contain the requested translation, the user 1 shadow table is accessed to determine if this shadow table contains an entry representing the requested page. If such entry is found and it is valid (i.e. its I=0), the entry content U1 (PFRA) is concatenated with the displacement D of the requested user 1 virtual address to generate the main storage address of the user 1 requested data. On the other hand, if the found entry is found invalid, a shadow page table miss signal is generated which initiates the above-described two-level address translation to be executed (beginning with the same address 110B at the top of FIG. 2A) by microcode in the manner previously described.

The level 3 interface has been found particularly useful for running users to test program components of an SCP at level 2, wherein a failure in the tested component merely causes one guest to stop running and does not shut down the VM system which can continue running with other guests operating at level 2.

GENERAL DISCUSSION OF THE INVENTION

Figure 5:
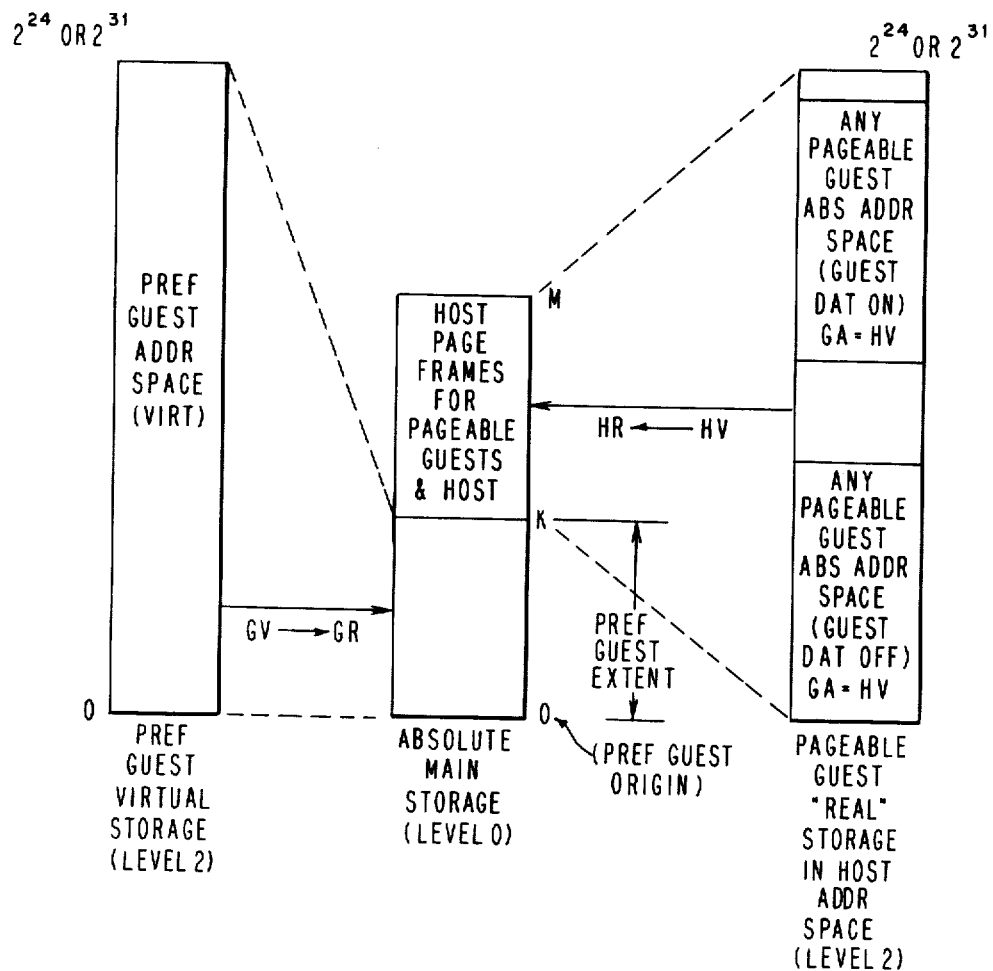

FIGS. 3, 4 and 5 illustrate summaries of various translation activities which may be used with this invention. FIG. 3 represents the operation of a pageable guest VM at level 2 having a user virtual address space 131 at level 3, which may have a byte size of $2^{24}$ or $2^{31}$ dependent on the level 2 architecture selected by the guest VM. Any 4096 byte page in the user address space 131 is mapped to an assigned "real" page frame in a user "real" extent assigned to the user within the related guest's virtual address space 132 by the translation from level 3 to level 2 (TRANS 3 to 2). That is, a user requested address in a user's address space in a guest virtual (GV) address which the guest must translate to a guest "real" (GR) address.

The guest address space appears to the host as one of the host's virtual address spaces. The host must then recognize the guest's "real" (GR) page frame address as a host virtual (HV) page address, in order to find the corresponding host real address (HR) to which prefixing is added to generate the absolute address in main storage (MS) 133. The MS page frame being used by any pageable guest need not be contiguous in MS.

In FIG. 3, arrow 130 represents the hardware TLB translation operation provided by this invention for a user requested address at level 3 to the same MS page frame at level 1 after its double level translation.

The bottom of FIG. 3 represents the sequence of component address transformations for changing a user requested address at level 3 into a main storage absolute address at level 0. The meaning of the illustrated symbols are: (T) is translation, (P) is prefixing.

FIG. 4 expands the summarized concept in FIG. 3 to a unique situation in which a plurality of pageable guests operate within a given host virtual address space. Arrows 136 and 137 represent the look-aside translations for the respective user 1 of guest 1 and user 1 of guest 2, respectively. MS page frames for the guests may be assigned in MS by the host. It is also realized that in any given system using virtual addressing, there may be a large number of guest VMs, and in turn any single guest may support any number of users for level 3 operation in the system, even though only one user is shown for each guest in FIG. 4.

FIG. 5 illustrates a summary of the translation operations for a preferred guest in a VM system which also has pageable guests. The single preferred guest is shown as a preferred guest virtual address space for which the guest's DAT is on. With virtual addressing, the preferred guest's address space may be $2^{24}$ or $2^{31}$ depending on the architecture selected by the preferred guest VM. If the guest's DAT is off, the guests level 2 address space will be "real" and will map directly into the preferred guest's main storage extent, which is assigned main storage addresses from 0 to K when the preferred guest is initialized by the host. The host is thereafter restricted to using the page frames in main storage having addresses from K to M, in which the host program and data are contained, and from which the host can assign page frames for use by pageable guests on demand. Thus, the host SCP may not thereafter allocate page frames within the preferred guest's extent from 0 to K. The preferred guest assumes full responsibility for main storage management within the guest's extent. When the preferred guest's DAT is off, the guest's address requests can be directly accessed in the guest's extent 0 to K, because the guest's addresses are not necessarily then translated. When the preferred guest's DAT is on, it provides its own single level DAT ST and PT in main storage (not shown in FIG. 1, but similar to the host ST and PT) which can be used to translate the preferred guest requested addresses into main storage real addresses in the preferred guest's extent. The preferred guest has a performance advantage over pageable guests due to each preferred guest address translation requiring only single level translation as compared with pageable guest double-level address translation requiring eight main storage accesses.

Figure 13:
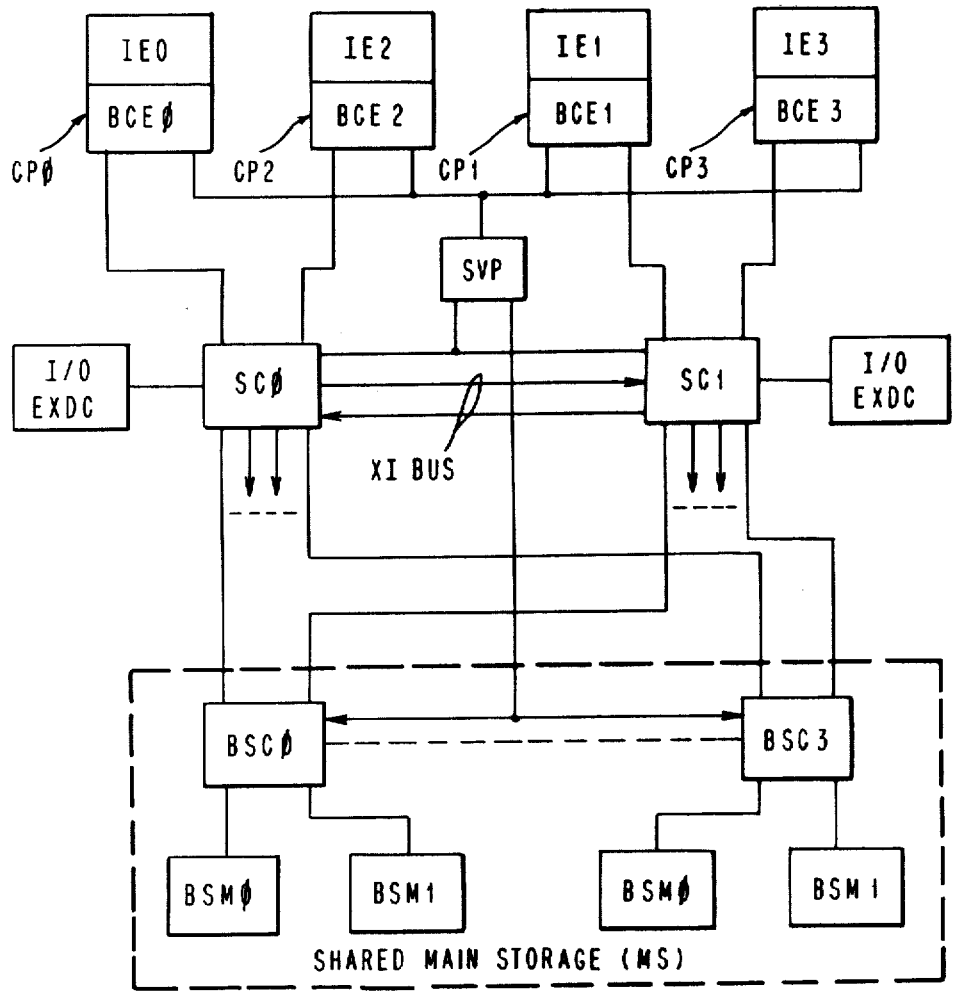
FIG. 13 illustrates an MP (multiprocessing) system in which each central processor (CP) may contain the subject invention.

FIG. 13 illustrates an example of a central electronic complex which may use the subject invention. Although FIG. 13 shows multiprocessor (MP) hardware with four central processors (CPs), the invention will operate with a minimum configuration of a single CP (i.e. a uniprocessor) connected to one BSM (basic storage module), and an I/O EXDC (external data controller) having the I/O channels of the system.

FIG. 7 illustrates a central processor (CP)6 containing the invention, which may be a UP or may be any one of the CPs in the MP shown in FIG. 13. The CP6 in FIG. 7 includes instruction unit (IE) hardware 20 which may be of conventional type except for the addition of SIE instruction execution means which is described later herein.

A programming system of the type represented by the IBM VM/370 control program (but modified to include the SIE instruction) is program loaded into the system to support a host which accommodates a plurality of guest virtual machines (VMs). The CP6 is also loaded with microcode including VMA type microcode for performing double-level address translation.

The host machine operation is initiated by any instruction stream dispatched by the host control program in the conventional manner. In FIG. 7, a host program is illustrated by the host instruction stream 21. A guest virtual machine operation is initiated by the host instruction stream 21 executing a start interpretative execution (SIE) instruction 22, which fetches fields from main storage in a state description (SD) control block 23 located by the B2, D2 fields in instruction 22. The SIE instruction is executed by the IE in the CP using its B2, D2 address as a real main storage address to fetch the various fields of SD23 from main storage (MS) 10 via a storage controller (SC) 20 and load them into special triggers and circuits provided in the CP6, which thereafter cause the CP6 to operate as the guest VM. The SD thus describes the architecture for the guest VM which will be seen by the guest instruction stream 33. The CP6 thereafter emulates the guest machine defined in the fetched state description as long as the guest program is executing. Thus, the guest instruction stream is initiated at a nested level under the host instruction stream by operation of the SIE instruction which, when executed, changes the CP6 to emulate the guest machine which then executes as the guest VM defined by the state description in the SIE instruction.

Among the CP circuits and triggers loaded by SD fields are a guest/native mode trigger 26 which is set to guest mode, a preferred/pageable guest mode trigger 27, an accelerated/non-accelerated preferred guest mode trigger 28 and an emulated/native architecture trigger 29. Other hardware loaded by SD fields includes prefix and extent limit registers, as well as control registers (CRs), program status word (PSW) registers, STO registers, general registers (GRs), etc. which are in the CP in FIG. 7 but are not all shown in detail.

The execution of the SIE instruction also causes the current state of the host machine to be saved by the IE.

Figure 6B:
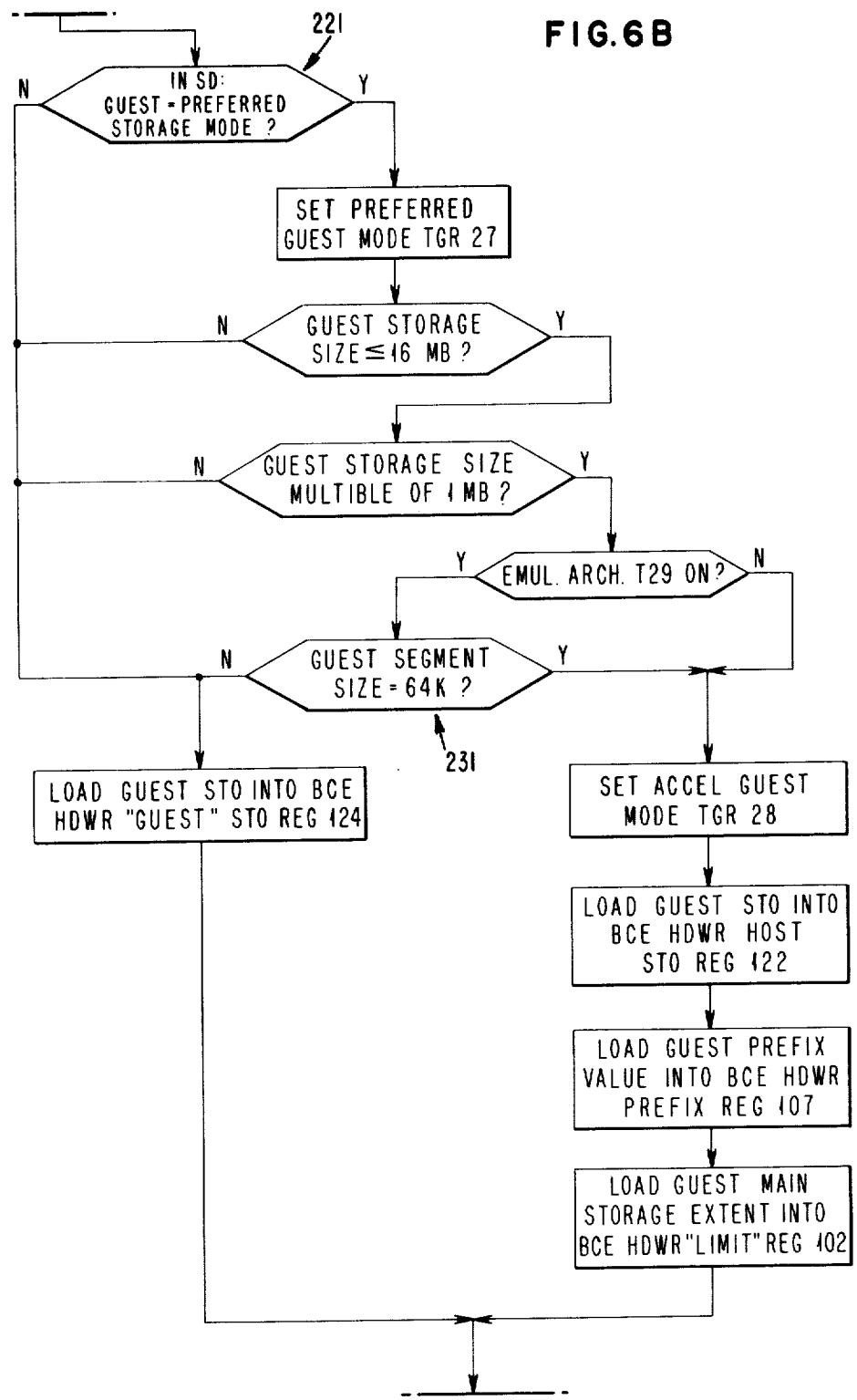
Figure 6C:
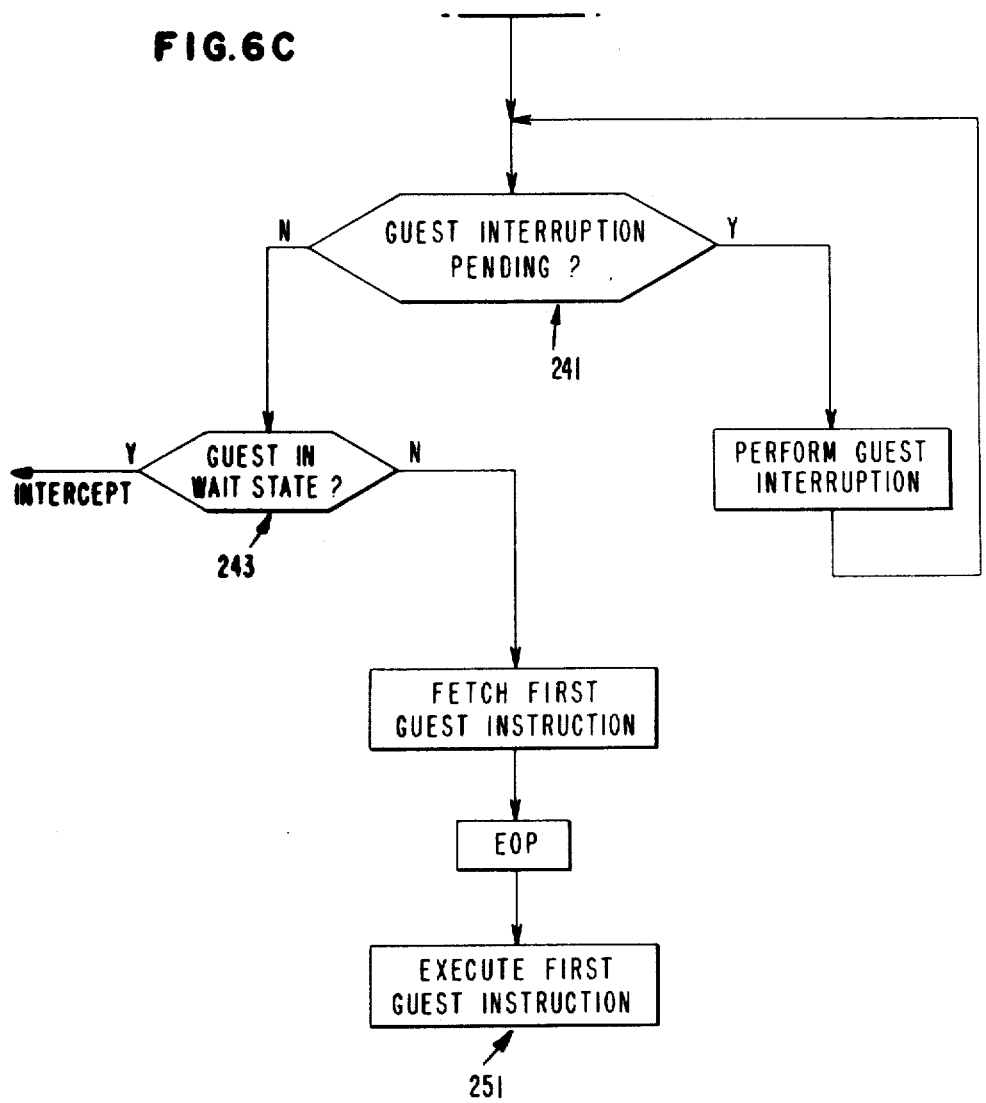

FIGS. 6A, 6B and 6C are a flow diagram providing a detailed self-explanatory description of the microcode execution of the SIE instruction.

Once initiated by the SIE instruction 22, the guest program continues its execution in the guest VM with the guest instruction stream 33 until an interception (exit) event or an interruption event is detected by IE detector 34 or 35, respectively. An interruption event is, for example, an I/O or external interruption requiring the host programming services. An interception event is, for example, the execution of any one of a number of instructions by the guest which require host programming services. A mandatory interception event occurs when the guest attempts execution of certain privileged instructions, while other privileged instructions may be optionally flagged by the interception mask received from the SD provided by SIE instruction 22 to cause an interception whenever any flagged instruction occurs during the execution of the guest instruction stream. On the occurrence of an interception or interruption event, the guest instruction stream 33 and the guest VM terminate, and the CP is restored to its host state saved when the SIE instruction was executed. That is the CP hardware is loaded from the saved information put into its LS (Local Store) in box 32 in IE 20 and into MS 10 when SIE was last executed. Then the host stream 21 again begins to execute the host instruction stream 21, starting with the host instruction following SIE instruction 22.

The following TABLE 1 represents the various native and guest CP modes which can exist in the preferred embodiment described herein. These CP modes are determined by combinatorial settings of the mode triggers 26, 27 and 28 in FIG. 7, as follows:

TABLE 1

| CENTRAL PROCESSOR MODE | CP NATIVE/GUEST MODES | | |
|---|---|---|---|
| | MODE TRIGGER STATES | | |
| | 26 Guest Mode T | 27 Pref. Guest Mode T | 28 Accel. Pref. Guest Mode T |
| Native Mode | Off | Off | Off |
| Guest Pageable Mode | On | Off | Off |
| Guest Non-Accelerated Preferred Mode | On | On | Off |
| Guest Accelerated Preferred Mode | On | On | On |

The guest mode setting of trigger 26 occurs on execution of a SIE instruction and indicates that the CP is set to emulate the guest architecture and state defined in the SD of that SIE instruction. The native mode setting of trigger 26 occurs when the host is dispatched and when a guest is terminated and indicates the executing program only sees the host defined architecture of the CP.

Trigger 27 is effective when trigger 26 is set to guest mode. Trigger 27 indicates whether the CP will operate as preferred guest VM or a pageable guest VM.

Trigger 28 is operative if trigger 27 indicates a preferred guest mode. Then trigger 28 indicates whether the preferred guest VM will operate in an accelerated mode. The accelerated mode enables the preferred guest to use the hardware dynamic address translation (DAT) circuits in the BCE to perform the single level translations required by a preferred guest. If non-accelerated mode is indicated by trigger 28, then preferred or pageable guest translations are not done by the BCE hardware but instead are done by IE microcode, with the microcode translation results being loaded into the hardware TLB 132 in BCE 31 shown in FIG. 10.

An emulated/native architecture type trigger 29 indicates whether the CP architecture used by the current guest is the native architecture of the machine or whether it is an emulated architecture (which is different from the native architecture. In the described embodiment, the native architecture uses 31 bit addresses with DAT on or off in instructions of the System/370 type. The emulated architecture uses 24 bit addresses with DAT on or off and may be System/370 or System/360. With DAT on, the native architecture can therefore support plural user address spaces each having $2^{31}$ bytes, while the emulated architecture can support user address spaces each having $2^{24}$ bytes.

All of the triggers 26, 27 and 28 are reset by a reset signal provided from IE 20 upon the occurrence of an interception or an interruption terminating the guest mode.

Figure 8:
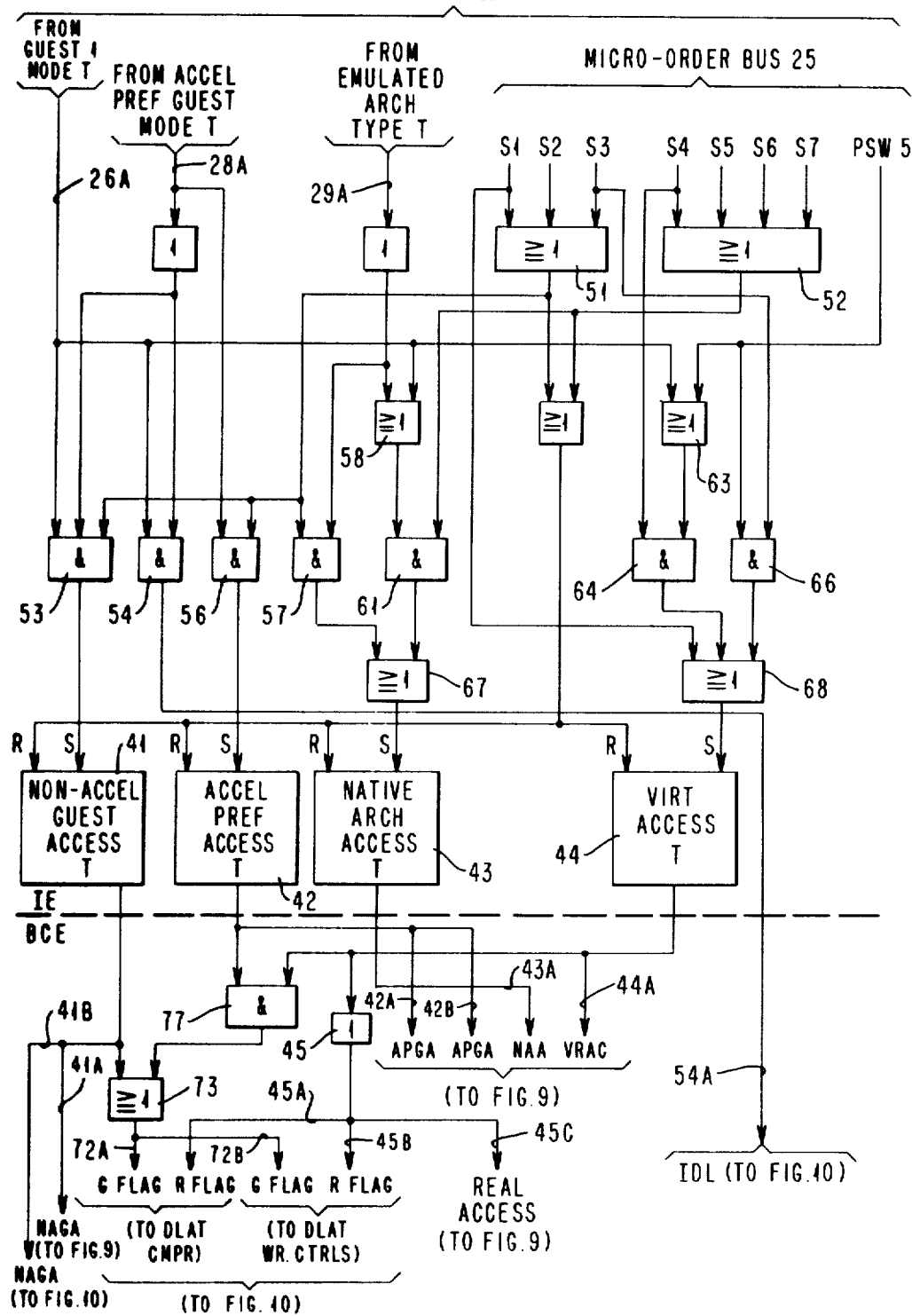
FIGS. 8, 9, 10, 11 and 12 respectively illustrate detailed circuit diagrams representing a preferred embodiment of the invention.

FIG. 8 illustrates in detail the access control circuits 31 shown generally in FIG. 7 and found within the IE and BCE. The access mode controls in FIG. 8 receive the outputs of the IE mode triggers 26, 28 and 29 as well as micro-order command outputs on bus 25 from FIG. 7. In FIG. 8, logic circuits are provided between the received signals and inputs to a plurality of storage access control triggers 41, 42, 43 and 44.

Figure 9:
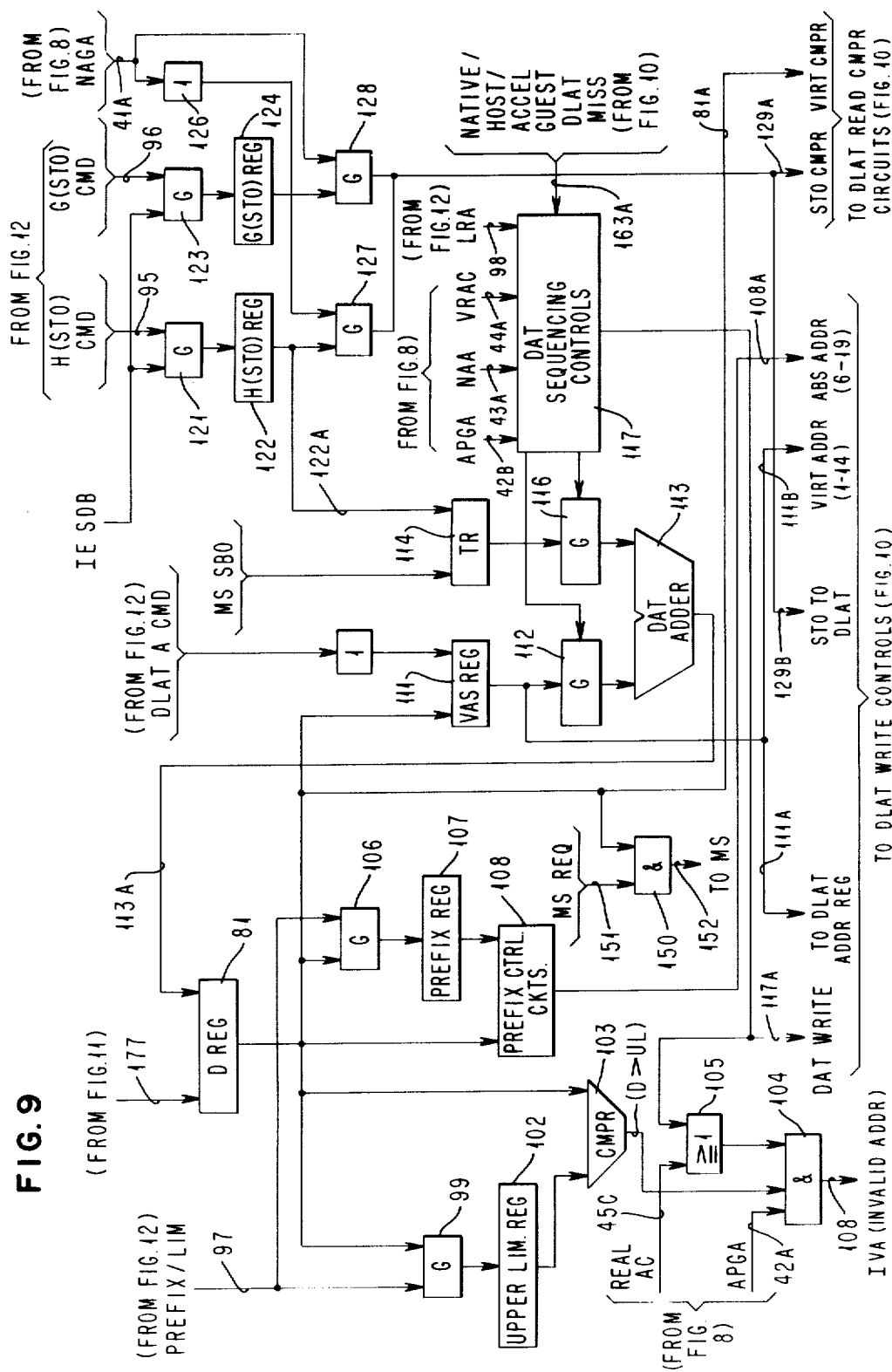
Figure 10:
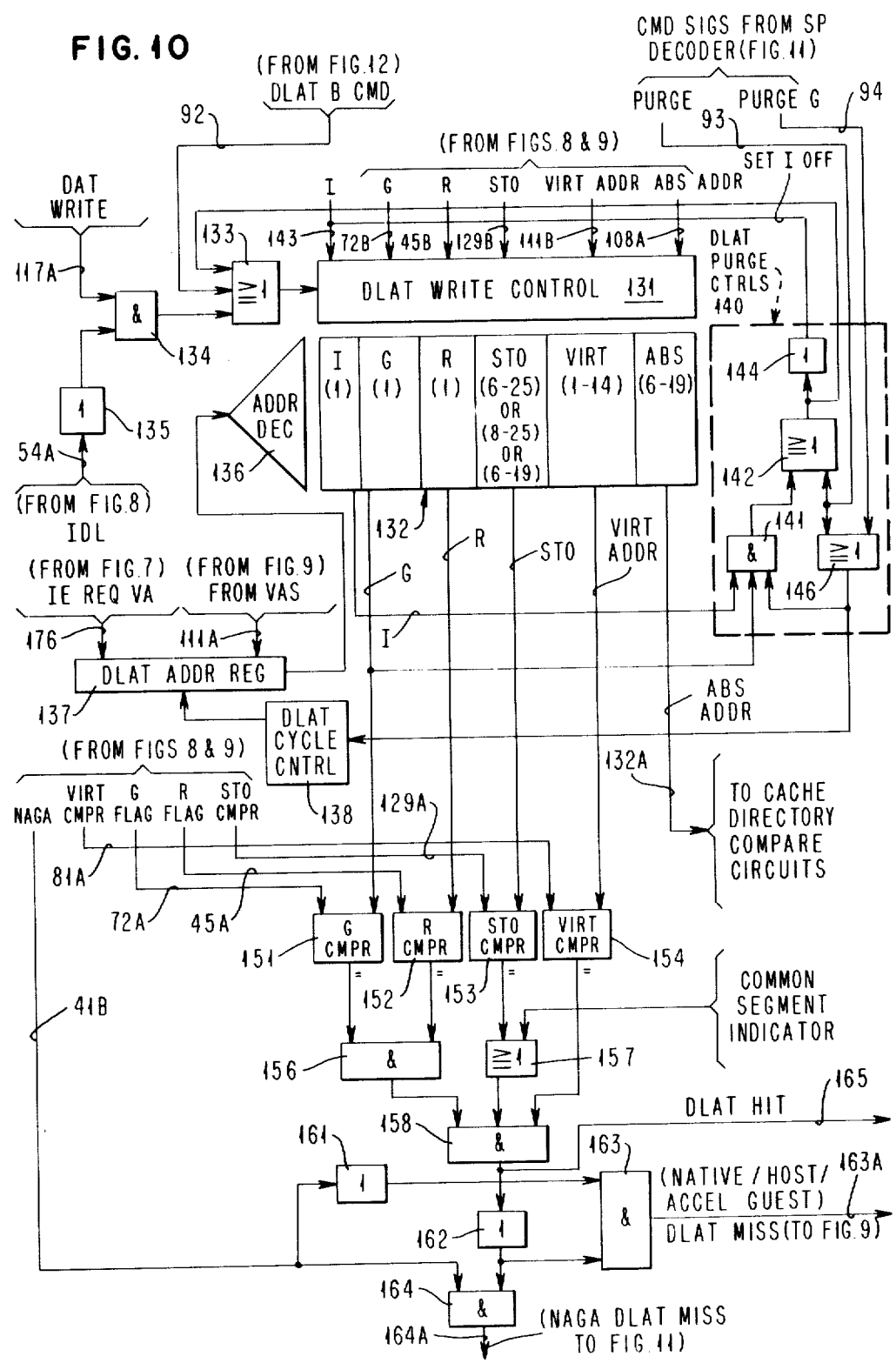

The settings of triggers 41, 42, 43 and 44 control the manner of operation of the translation circuits in FIG. 9 and the DLAT circuits in FIG. 10 in response to each CP storage request.

These triggers are reset by the OR of any of the seven micro-order signals shown in TABLE 2, and a trigger will be set on if it receives a simultaneous set and reset. Non-accelerated guest access trigger 41 is set by AND gate 53 when it receives a guest mode input from trigger 26, a non-accelerated guest mode input from trigger 28 via an inverter, and the output of OR circuit 51 which signals a guest request when receiving any of the microorder guest request signals S1, S2 or S3, which are defined in TABLE 2 below:

TABLE 2
REQUEST TYPE MICROCODE ORDER SIGNALS

| MIRCOCODE ORDER | REQUEST TYPE |
|---|---|
| S1 | Virtual (Host or Guest) |
| S2 | Real (Host or Guest) |
| S3 | Logical (Host or Guest) |
| S4 | Host Logical |
| S5 | Host Real |
| S6 | Host Absolute |
| S7 | Native/Host System Area |

In FIG. 8, the accelerated preferred guest access trigger 42 is set when an accelerated preferred guest signal is provided by trigger 28 while OR circuit 51 is receiving access mode request microorder signal S1, S2 or S3. An inhibit DLAT load (IDL) signal is provided by an AND circuit 54 when it receives a guest mode signal from trigger 26 and a non-accelerated guest mode signal from the inverted output of trigger 28. While the IDL signal is on, the DLAT cannot be stored into by the hardware DAT logic.

TABLE 3 below indicates the various storage access types for IE requests to the BCE, as determined by the settings of the guest trigger 26, the accelerated preferred guest mode trigger 28, and the inhibit DLAT load signal (IDL) on line 54A.

TABLE 3
CP STORAGE ACCESS TYPES

| ACCESS TYPE | Non-Accel. Guest Acc. T | Accel. Pref. Guest Access T | Inhibit DLAT Load Signal |
|---|---|---|---|
| Native Access | Off | Off | Off |
| Host DLAT Access (In Guest Mode) | Off | Off | On |
| Non-Accel. Guest Access | On | Off | On |
| Accelerated Preferred Guest Access | Off | On | Off |

Also in FIG. 8, native architecture access trigger 43 indicates whether or not the requested access is using the native or an emulated architecture. Trigger 43 is set by the output of OR circuit 67 when it receives an input from either an AND circuit 57 or 61. AND circuit 57 is activated by a signal from OR circuit 51 and a native architectural type signal from trigger 29 through an inverter. AND circuit 61 is activated by a signal from the output of an OR circuit 52 and the output of an OR circuit 58 providing either a native architecture type signal from trigger 29 via an inverter or a signal from guest mode trigger 26.

Virtual access trigger 44 is set by the output of an OR circuit 68 when a virtual address is requested by any virtual request microorder signal to OR circuit 51 or 52, as defined in TABLE 3 above in which a logical request provides a virtual address if the DAT bit (PSW 5) is on in the PSW of the requesting machine, native or guest.

Figure 11:
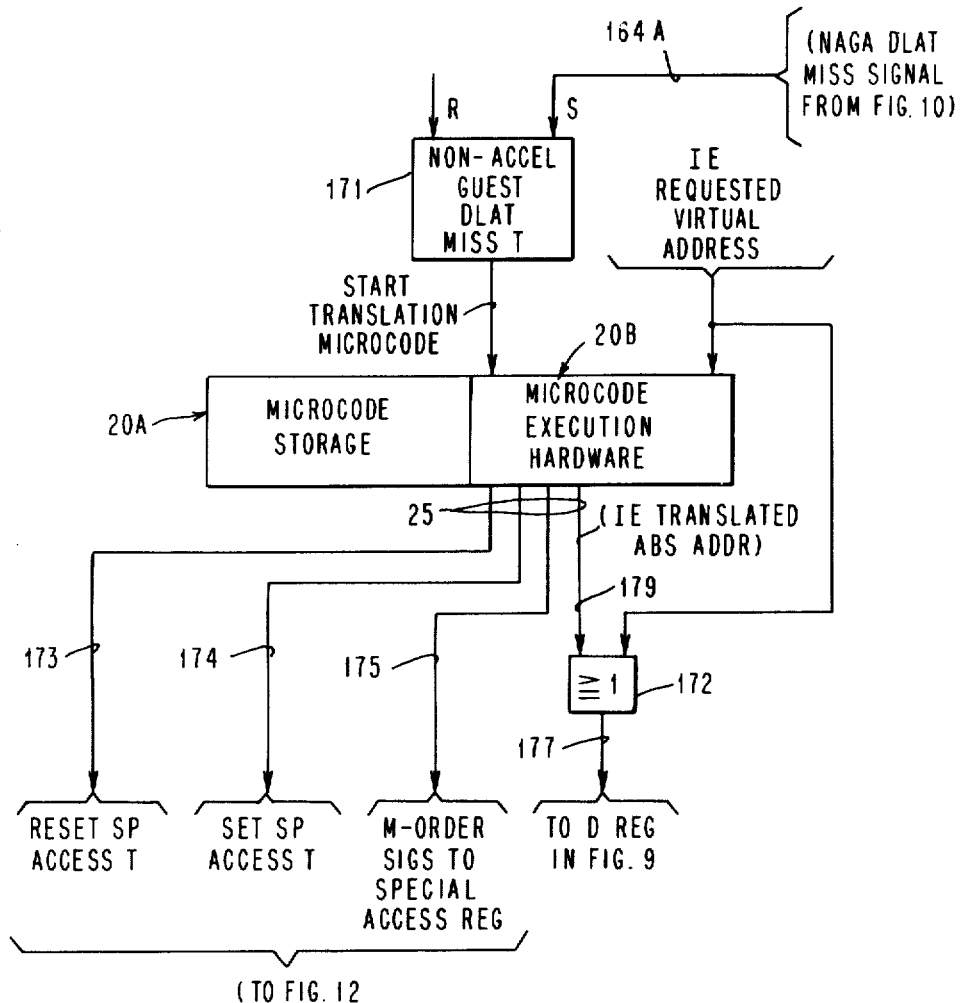
Figure 12:
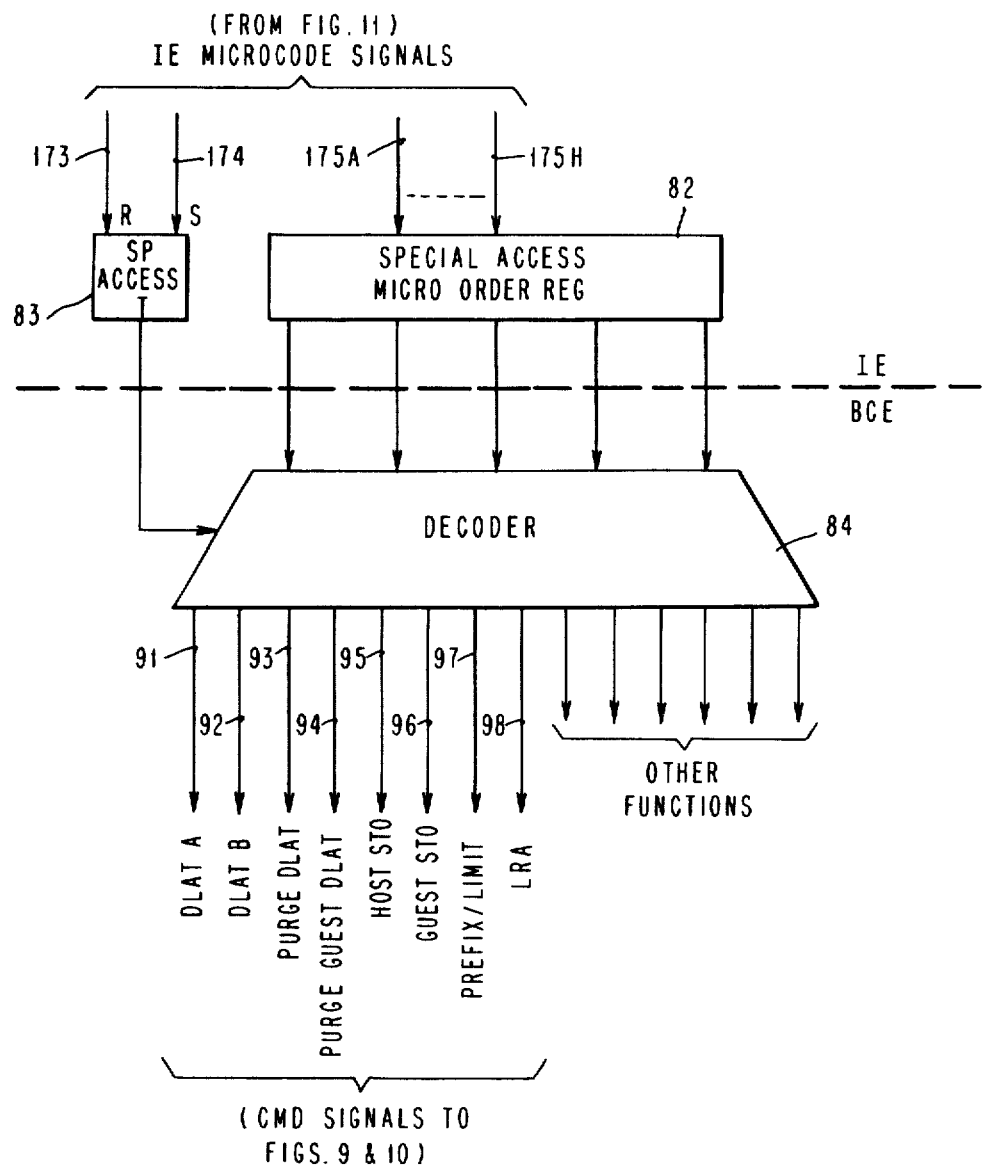

FIG. 12 shows special command circuits for controlling BCE operations relating to guest or host requests. These special commands control the loading of BCE registers, the writing into a DLAT entry, and the purging of the DLAT entries. In FIG. 11, the microcode controls 20A in IE 20 issue each command as a set of micro-order signals on bus 25 which includes lines 173 and 174 to a special access trigger 83 and line 175 to a special access micro-order register 82 in FIG. 12. Micro-order signals are provided on lines 175A-175H at the same time that special access trigger 83 is set by a signal from IE 20 on line 174. The output of trigger 83 activates a decoder 84 in the BCE to decode the micro-order signals set in register 82 to activate one of a plurality of output lines from decoder 84 according to the particular command being signalled. Outputs 91-98 are pertinent to the subject invention. The other outputs provide other functions which are not pertinent and therefore will not be discussed.

The decoded command signal on line 95 or 96 controls the loading of the host STO or guest STO into the BCE circuits in FIG. 9 by activating either gate 121 or 123 to transfer the host STO or the guest STO from an IE storage bus (SDB) into either register 122 or 124. A signal on lines 97 loads the prefix and limit registers 107 and 102 in FIG. 9. It is only after the initializing of the STO and prefix registers that the access control circuits in FIG. 8 through 10 can operate to control the selection and read out of an entry in the DLAT 132, or control the writing of an entry in DLAT 132, or inhibit the writing in the DLAT of certain types of entries which would degrade DLAT operation. The decoded commands on lines 93 and 94 in FIG. 12 control different manners of purging entries in the DLAT.

For a DLAT operation, either the host or guest STO must first be selected in FIG. 8. STO selection is controlled by the output state of the non-accelerated guest access (NAGA) trigger 41 in FIG. 8 which provides its NAGA output to FIG. 9 to activate either gate 128 or 127 to select either the host STO or the guest STO for transmission on lines 129A to provide the particular STO used for the selective readout or write-in of an entry in DLAT 132.

In FIG. 8, a G (guest) flag signal is provided on lines 72A and 72B to identify a DLAT entry as representing a guest or host translation. A host entry is indicated when G is a zero bit, and a guest entry is indicated when G is a one bit. The G flag signal is generated by the output of OR circuit 73 when it receives a signal from trigger 41 indicating whether the request is for a non-accelerated guest, or a signal from an AND gate 77 indicating a virtual access request by an accelerated preferred guest due to signals from triggers 44 and 42.

An R flag signal is provided on lines 45A and 45B to identify if a guest request (i.e. in which G=1) provides a virtual address or real address. The R flag is a zero bit if the guest requested a virtual address, and is a one bit if the guest requested is a real address. The R flag is the inverted output 45 of virtual access trigger 44.

Also, FIG. 8 provides signals on lines 42A, 42B, 43A and 44A to control the DAT operations done in FIG. 9, which is done for accelerated preferred guest requests as well as for native/host requests, all of which require a one-level translation.

The inhibit DLAT load (IDL) signal on line 54A to the DLAT write controls in FIG. 10 controls the writing into a selected DLAT entry of an address translation for the current IE request. The G and R flag signals are provided on lines 72 and 45 to control the DLAT operations for guest requests. Thus, the G flag indicates if the current request is from a guest or the host, while the R flag indicates if a current guest request is using a virtual or real address.

The method by which this invention switches the guest prefix values into the CP prefix register is novel with this invention, and eliminates the need to use a guest's page table to simulate prefixing of the guest's real page zero.

Thus in the embodiment, when the SIE instruction is executed, its microcode: (1) in FIG. 6A stores the host prefix into the CP local store from prefix register 107 in FIG. 9; (2) in FIG. 6B determines if the accelerated mode is to be used, then sets accelerated guest mode trigger 28 in FIG. 7, and loads the preferred guest prefix value obtained from SD into prefix register 107.

When the SIE instruction execution completes due to interception or interruption, the host prefix is moved from local store into prefix register 107.

A guest MS limit value is loaded from the SD into limit check register 102 at the same time that the guest prefix is being loaded from the SD into prefix register 107, which values are simultaneously transferred through different fields in D register 81.

While the accelerated preferred guest mode exists, both limit checking and prefixing of the guest's translated addresses are accomplished at no cost in CP performance, as occurred in prior VM/370 systems. Limit checking determines if each request is within the MS extent provided for the preferred guest by the SD of the last loaded SIE instruction.

Host program storage references are not limit checked. Microcode originated references to host main storage are not subject to host prefixing because they are references to the SD which should not be in any prefix or reverse prefix area in main storage.

A prefix/limit command on line 97 from FIG. 12 to FIG. 9 causes the transfer of an upper limit (UL) value and a prefix value from different fields in a word sent by the IE through a D register 81 into upper limit register 102 and prefix register 107 under the control of acceleration mode trigger 28.

One active preferred guest may exist as shown in FIG. 5, and the guest's lower limit is a zero displacement value and therefore is not checked in FIG. 9.

FIG. 9 also illustrates a conventional type of dynamic address translation (DAT) adder 113 and DAT sequencing controls 117, which provide a one-level translation for a requested virtual address involving two main storage references of the segment table addressed by the STO on lines 122A to the TR register 114, and the page table addressed from the PTO accessed in the segment table entry which is provided from main storage bus out (SBO) to the TR register 114. The VAS register 111 receives the SX and PX components of the virtual address during the translation, and each resultant address from DAT adder 113 is provided into D register 81 and transferred to main storage for accessing. The DAT sequencing controls 117 control the DAT translation operations under control of its input lines, such as line 42B which controls a translation for an accelerated preferred guest, line 43A which controls a native/host translation, line 44A which indicates if the request is for a virtual or real address, and line 98 which is a special command line activated by the IE when it executes a load real address (LRA) function which causes the DAT adder 113 to translate the IE supplied virtual address with the resultant translated output of DAT adder 113 being sent back to the IE instead of to main storage so that no actual main storage access results and the translation is not entered into DLAT 132.

Host requested real addresses not requiring translation (i.e. host DAT off) are not entered into DLAT 132. Also, accelerated preferred guest real addresses not requiring translation (i.e. preferred guest DAT off) are also not entered into DLAT 132. Thus, the only host-/native or guest requests requiring translation (indicated by virtual access trigger 44) are put into DLAT 132. Requested real addresses not requiring translation are prefixed (if necessary) and sent to main storage for accessing, and are not sent to DLAT 132.

FIG. 10 illustrates the DLAT (Dynamic lookaside translation) buffer 132 which contains translations that have recently been done for either a guest or a host request. DLAT 132 is presumed to be set-associative in this specification in the conventional manner of set-associative DLAT's, e.g. two-way set associative DLAT's are used in current commercial IBM large systems such as the 3033 central electronic complex. However, novelty exists in DLAT 132, which differs from prior DLAT's by containing in each entry a guest (G) bit and a real (R) bit, in addition to the prior used fields which include an invalidity (I) bit (which sometimes is called a validity (V) bit), an STO field, a virtual address (VA) field and an absolute address (AA) field. A row in DLAT array 132 is called a set-associative congruence class, because it is presumed to have plural entries (even though only one entry is shown in FIG. 10 per congruence class). Each class is selected by the output of an address decoder 136 when it receives the current IE requested virtual address provided from a DLAT address register 137.

A set of DLAT compare circuits 151, 152, 153 and 154 is provided for each entry in a set-associative class, (one set is shown in FIG. 10) to determine if any of the entries in the selected congruence class represents the requested address. (The prior art teaches how plural sets of compare circuits can be used for set-associative DLAT's.) If the compare circuits find that the requested address is represented by an entry in the selected congruence class, a DLAT hit signal is provided on line 165. If the requested address is not represented in an entry in the selected class, then a DLAT miss signal is generated on either line 163A or 164A. The DLAT miss signal on line 163A can occur for a native/-host request or an accelerated preferred guest request, any of which require a single level translation by the DAT hardware in the BCE. A DLAT miss signal on line 164A can occur for a non-accelerated guest access (NAGA) request.

A miss signal is generated when less than all of compare circuits 151, 152, 153 and 154 provides a compare-equal output (except for a common segment indication which does not require STO equality). AND gates 156 and 158 combine all equal outputs from gates 151, 152, 153 and 154, (including a forced equality from an OR circuit 157 if a common segment is involved) to generate a hit or miss output.

In more detail, compare circuit 151 compares the G bit outputted by a selected DLAT entry and the current request's G flag provided on line 72A. Compare circuit 152 compares the R bit outputted by the selected DLAT entry and the current request's R flag being provided on line 45A. STO comparator 153 compares the STO in the selected DLAT entry with the STO being provided for the current request from the selected STO register 122 or 124 in FIG. 9, and virtual address comparator 154 compares the virtual address bits in the DLAT entry and corresponding virtual address bits of the current request being provided on line 81A from FIG. 9. Thus, if the outputs of all comparators 151, 152, 153 and 154 indicate an equal condition, a "hit" exists for the current request, which is then signalled on line 165 and accessed in the DLAT entry having the equality by conventional circuits not shown in this specification. Conversely, a DLAT miss occurs as an output from inverter 162, which is selected by either AND gate 163 or 164, depending upon whether the request was made by a non-accelerated guest request, or by a host/native or accelerated guest request.

If a request misses in the DLAT, then the translation of the request must be written into an entry in the selected DLAT congruence class whereby the entry is selected in the conventional manner by an LRU circuit (not shown). The DLAT entry is written by DLAT write control 131 in FIG. 10. It is activated by the output of an OR circuit 133 while any of the three illustrated inputs is activated. One activating input is from an AND gate 134 which is activated by a DAT write signal on line 117A and no IDL signal from inverter 135 receiving the IDL line 54A. When write control 131 is activated, it writes into the selected DLAT entry the one or zero states existing on the invalid bit line 143, the G flag line 72B, the R flag line 45B, the STO lines 129B, the virtual address lines 111B, and the absolute address lines 108A from FIGS. 8 and 9. The I bit is set valid in the entry being written. An intermediate state may also exist on any of these lines which is not the one or zero state and which does not change the corresponding field in the entry being written.

A miss signalled on line 163A is provided to the DAT sequencing controls 117 in FIG. 9 to activate a DAT operation by adder 113 which internally operates in the manner of DAT circuits in current machines such as the IBM 3033 CEC. The difference from the prior art is in the controls provided to initiate a DAT operation and to select the STO used for the translation.

A miss signalled on line 164A is provided to the IE to initiate a microcode translation of the guest address, which may be either a single-level or double-level translation, as required by the type of request.

The IE unit will perform the guest segment table lookup by adding the guest STO to the SX portion of the virtual address and then adding the host offset value to obtain a host virtual address. In FIG. 11, this resultant host virtual address is provided by the IE on line 177 via OR circuit 172 to D-Reg 81 in FIG. 9 with triggers 41 and 42 reset. This address is then gated into VAS register 111 for translation procedures if a DLAT miss should occur. The host STO register 122 content is put into TR register 114 and controls 117 activate gate 112 to output the SX from register 111, so that the ST entry address is generated by adder 113 and put into the D register 81, from which it is sent to main storage (MS) as an MS request.

The ST entry returns on MS SBO (storage bus out) and is put into TR register 114. Controls 117 then enable gate 112 to output the PX field in VAS register 111, so that adder 113 then generates the PT entry address which is sent to D register 81 and requested in MS. The PFRA address is then accessed in MS and returned on MS SBO into TR register 114, from which it is passed through adder 113 along with the page offset bits from the VAS register into D register 81.

Since line 54A is active, the DLAT write will be inhibited. The address in the D-reg is sent to main storage (MS) as an MS request. The data from this access, which is the guest segment table entry, is returned to the IE unit. A similar type of procedure is performed to obtain the guest page table entry. The results of that access are then concatenated with the guest page offset added to the host virtual offset and presented to the BCE on line 177. Instead of a Fetch operation, a signal on a LRA line 98 in FIG. 12 is issued which controls the DAT sequencing controls 117 to return the page table entry to the IE unit.

The IE unit will issue a special command called the DLAT A command on line 91 and pass the guest virtual address on line 177. The DLAT A command will lock this virtual address into the VAS register 111. The IE unit will then issue a special command called the DLAT B command on line 92 and pass the host absolute address on line 177. Also, trigger 41 is set on along with the other mode triggers (43–44) that describe the type of guest. The DLAT B command will activate the DLAT write circuit 133 to write the selected DLAT entry in accordance with the signals on lines 143, 72B, 45B, 129B, 111B and 108B to complete a BCE single-level translation entry in DLAT 132.

The hardware DAT operation is used by both native/host requests and by accelerated preferred guest requests. In either case, the single-level translation has the same fast speed of operation.

The IE determines whether a guest request translation will be accelerated or not. All native/host translations are accelerated, i.e. done by the BCE hardware.

A non-accelerated guest request is determined if the guest request cannot be translated by operation of the BCE hardware, i.e. DAT sequencing controls 117 and DAT adder 113. If a non-accelerated guest request is to be made, the IE 20 sends a set signal to trigger 28, and the DAT adder 113 and sequencing controls 117 will not operate to perform the translation and the translation will be done by IE microcode. Non-accelerated guest requests include preferred guest requests which for some reason cannot be handled in the BCE, e.g. the limit register is the wrong size for checking the request upper limit, or the virtual address size is not compatible with the DAT adder size such as the adder input has improper alignment of the SX and PX positions in a requested virtual address, etc. All preferred guest translations are one-level translations involving two main storage accesses, regardless of whether the preferred guest request is accelerated or not, but the BCE hardware operates faster than IE microcode performing the same translation and hence the BCE "accelerates" the translation.

Pageable guest requests are never accelerated in this embodiment, i.e. do not use the BCE DAT adder 113 and DAT sequencing controls 117, but are done by IE microcode. A pageable guest may therefore initiate a double translation operation by VMA type microcode in the IE microcode execution hardware 20B in FIG. 11. The microcode is provided from the microcode storage 20A, which may operate in the conventional manner to execute a double translation as previously explained for loading a shadow-table in regard to FIG. 2 herein.

However, with this invention, no shadow-table is used. During the execution of any translation by IE microcode, the novel IDL signal is provided on line 54A to inverter 135 in FIG. 10 to deactivate the DLAT write controls 131 during the existence of the non-accelerated guest mode. When the translation is completed by the microcode, the resulting absolute address is provided from IE 20 in FIG. 11 on absolute address bus 179 via OR circuit 172 and bus 177 to D-reg 81 in FIG. 9, from which it is provided on lines 108A to the DLAT controls 131 in FIG. 10 at the same time that the valid bit, G R STO and VA inputs are active to write controls 131 for the translated request. At the same time that IE 20 provides the translated absolute address, IE 20 also provides special micro-order signals on lines 175 to microorder register 82 in FIG. 12, which are decoded to activate the DLAT B signal on line 92 to OR circuit 133 in FIG. 10 which activates the DLAT write controls 131 to write the translation into the selected DLAT entry.

This invention enables the IE to selectively purge guest entries from DLAT 132, without affecting any host entries in the DLAT. A guest purge, for example, may be done when the CP state is switched from guest state back to host state when a guest program ends execution due to an interception or interruption. This allows the host program, which then begins execution, to use the available TLB entries in the DLAT without needing to invalidate any host entry, which potentially increases the system operating efficiency.

Thus, when a guest program loses the CPU resource, IE 20 in FIG. 11 can automatically issue a guest DLAT purge command on lines 175 whenever it issues a reset signal to guest mode trigger 26 in FIG. 7 to cause a guest DLAT purge signal on line 94 in FIG. 12.

The DLAT purge controls 140 in FIG. 10 receive a signal on line 94 to condition a DLAT cycle control 138 which cycles through all of the class addresses possible in DLAT 132, causing each DLAT entry to have its I and G bits outputted from DLAT array 132 to an AND gate 141 which is being conditioned by the signal on line 94. Thus, AND circuit 141 is enabled by each valid guest DLAT entry (i.e. I=1 and G=1) and provides its output through an OR circuit 142 and inverter 144 to the invalid bit input line 143. The output of OR circuit 142 is provided also to OR circuit 133 to activate the DLAT write controls 131 and cause the entry currently being read out to have its invalid bit set to the invalid state of zero. When the class cycling is completed by the DLAT cycle controls 138, all guest DLAT entries are invalidated, but the state of each host entry in the DLAT is not affected because its G bit is in zero state which prevents gate 141 from being enabled by any host entry.

Of course the conventional type of purge TLB instruction may be done in DLAT 132 by a special command which activates the purge line 93 from decoder 84 in FIG. 12 to FIG. 10 which causes all entries to be invalidated by having line 93 provide an input to DLAT cycle control 138 via OR circuit 146, and to OR circuit 142 which sets invalid every DLAT entry as it is being cycled, ignoring the G and R bits in the DLAT entries.

Hence, a limit check operation occurs in the embodiment whenever an accelerated preferred guest makes an access request. The access request address is provided by the IE to D-reg 81. If the preferred guest has DAT off, D-reg 81 receives a real address which is immediately limit checked. If the preferred guest has DAT on, the limit checking is not done until the real address is available, which is after the guest virtual address is translated, which is provided from the D-reg 81 to the limit check hardware. The timing of the limit checking is done by inputs to AND gate 104. Line 44C times when a request is received with DAT off. Line 117A times when the real address is available from a translation. Lines 44C and 117A are inputs to an OR circuit 105 which output times the operation of IVA gate 104. Comparator 103 inputs to gate 104 when the specified upper limit is exceeded by the request. The APGA line 43A conditions the IVA gate 104 so that only accelerated preferred guests can enable it. The input from the APGA line 43A may be eliminated so that all preferred guest requests are limit checked if all the limit hardware supports such checking. Thus, if comparator 103 finds that the address D is greater than UL, an invalid address is signalled from an AND gate 104 for a preferred guest signal from line 44C indicating that a real (or absolute) access is being tested in comparator 103, and from line 43A indicating an accelerated preferred guest address is being tested.

An invalid address (IVA) output from gate 104 causes an address specification exception in the conventional manner to the central processor so that it can generate a program interrupt in the standard manner.

While the invention has been particularly shown and described with references to preferred embodiments thereof, it will be understood by those skilled in the art that the foregoing and other changes in form and details may be made therein without departing from the spirit and scope of the invention.

Having thus described out invention, what we claim as new and desire to secure by Letters Patent is:

1. In a data processing system having at least one central processor (CP) and a main storage (MS) for supporting a host control program and at least one guest control program, the CP including an instruction execution (IE) unit for executing instructions and generating real or virtual address requests for accesses in main storage or a cache for host or guest programs, a hardware translation lookaside buffer (TLB) having a plurality of addressable entries, each TLB entry containing a validity flag field, a STO (segment table origin) field, a virtual address field and an absolute address field, the system comprising:
   mode indicating means in the CP for indicating a host or guest state to respectively indicate whether the host or a guest control program is in control of the CP, each control program having a respective prefix save area (PSA) in main storage containing at least old and new program status words (PSWs) for the respective control program,
   a real/virtual flag field in each TLB entry for indicating whether the entry contains a translation of a guest real address or a guest virtual address, whereby the real/virtual flag field indicates whether a valid address translation represented in the entry is for a guest real address or a guest virtual address,
   a guest/host indicating means for indicating whether an entry contains a translation for the host control program or the guest control program,
   CP storage request control means signalling to the TLB with each guest storage request a real/virtual indicating signal,
   TLB compare circuit control means receiving and comparing the real/virtual indicating signal with a real/virtual flag field in a selected TLB entry and signalling a TLB miss if a non-equal comparison occurs while the mode indicating means is set to guest state.

2. In a data processing system haivng at least one central processor (CP) and a main storage (MS) for supporting at least one guest virtual machine (VM), the CP including an instruction execution (IE) unit for executing instructions and generating real or virtual address requests for accesses in main storage or a cache, dynamic address translation (DAT) means, a hardware address translation lookaside buffer (TLB) having a plurality of entries, each TLB entry capable of containing an address translation including a validate field, a STO (segment table origin) field, a virtual address field and an absolute address field, DAT mode indicating means in the CP being controlled by a current PSW (program status word) in the CP, the CP also comprising:
  guest indicating means for being set to indicate when the CP is in host mode or guest mode, the host mode indicating that the CP is being used by the host control program, and the guest mode indicating that the CP is being used by a guest program,
  means in the CP for executing a SIE (start interpretive execution) instruction in a host program for transferring CP control to a guest program by storing host state parameters and by fetching guest state descriptor fields from main storage to set guest state fields in the CP and by setting the guest indicating means to guest state,
  DAT initiation control means actuatable by a guest address request while the guest indicating means and the DAT mode indicating means are set to an on state,
  whereby the hardware TLB in the CP can receive guest address translations while the guest indicating means is set to guest mode so that a guest program can perform address translations without intervention by the host control program.

3. In a data processing system as defined in claim 2, the guest indicating means further comprising:
  a guest mode bistable means for being set on by the CP executing a SIE instruction in a host program to indicate the CP has a guest emulation state.

4. In a data processing system as defined in claim 3, the CP further comprising:
  guest field means with each TLB entry for indicating whether a TLB entry contains a guest or host address translation, the guest field means being settable to guest TLB state or host state,
  whereby different entries in the TLB may simultaneously contain guest and host address translations.

5. In a data processing system as defined in claim 4, the CP further comprising:
  means for registering a host STO (segment table origin absolute address) and means for registering a guest STO to control address translation by the CP,
  STO selection means for selecting either the host STO registering means or the guest STO registering means according to the setting of the guest mode bistable means.

6. In a data processing system as defined in claim 5, the CP further comprising:
  CP address request means for signalling to the TLB each CP storage request including a guest/host indicating signal for indicating whether each request is by a guest program or by a host program,
  compare circuit control means for receiving a TLB output for a CP storage request including a STO provided by an outputted TLB entry and comparing the STO with a guest STO or a host STO in the registering means selected by the STO selection means, the compare circuit control means also receiving and comparing the guest/host indicating signal received from the CP address request means with the content of a guest field means provided in the TLB output to signal that a requested address translation is not in the TLB if a non-equal comparison occurs,
  whereby a TLB miss signal is generated by the compare circuit control means by a non-equal compare if the TLB does not contain a requested address translation.

7. In a data processing system as defined in claim 2, the CP further comprising:
  guest real address indicating means for the TLB for indicating whether a respective guest entry in the TLB contains a single level or a double level address translation.

8. In a data processing system as defined in claim 6 or 1, the CP further comprising:
  a host virtual address space for use by a host control program (host), a preferred guest program (preferred guest) being assigned an initial part of the host virtual address space,
  a preferred guest bistable means for being set by the CP executing a SIE instruction to indicate a preferred guest can directly address part of the host virtual address space using guest address translation without any host address translation,
  hardware translation means being activated by a miss signal when the preferred guest bistable means is set and a preferred guest provides a virtual address request to obtain a guest address translation not in the TLB.

9. In a data processing system as defined in claim 6 or 1, the CP further comprising:
  a pageable guest bistable means for being set by the CP executing a SIE instruction to indicate a pageable guest which directly addresses part of the host virtual address space which requires host address translation to address main storage.

10. In a data processing system as defined in claim 6 or 1, the CP further comprising:
  a non-accelerated guest indicating bistable means being set by the CP executing a SIE instruction when the CP determines that storage requests by a non-accelerated guest cannot be translated using a hardware translation mechanism in the CP but instead must use translation means found in the CP.

11. In a data processing system as defined in claim 10, the CP further comprising:
  microcode translation means in the CP,
  non-accelerated guest miss bistable means, a guest TLB miss signal occurring when the non-accelerated guest indicating bistable indicating means is set on and a CP address request provided by a guest program does not have a translation available in the TLB,
  the microcode translation means being actuated to execute a translation of the CP address request in response to the guest TLB miss signal when the non-accelerated guest bistable indicating means is set, whereby a non-accelerated guest requested address is translated by the CP microcode translation means.

12. In a data processing system as defined in claim 9, the CP executing a two level address translation of a guest requested address, the two level address translation using intermediate host address translations, the CP further comprising:
   TLB write means for writing a translation into a selected TLB entry,
   TLB inhibiting means for inhibiting the TLB write means from writing a translation into the currently selected TLB entry,
   IE command means for signalling the TLB write means to write a resulting translation into the selected TLB entry,
   whereby the result of a two level address translation of a guest requested address can be entered by the TLB write means into a TLB entry while intermediate host address translations which are components of the two level address translation are not entered into the TLB in response to the TLB inhibiting means to avoid displacement of potentially good TLB entries.

13. In a data processing system as defined in claim 6 or 1, the CP further comprising:
   guest purge control means being provided with the hardware TLB for invalidating the content of one or more TLB entries associated with a guest,
   the IE command means signalling a guest purge command when guest entries are to be selectively remove from the TLB,
   selective invalidation means connected to the guest purge control means for invalidating each entry in the TLB currently having a guest indicating signal.

14. In a data processing system as defined in claim 13, the CP further comprising:
   the selective invalidation means further including,
   TLB cycling means for cycling the outputting of particular entries in the TLB,
   whereby the guest purge control means invalidates TLB entries (containing guest address translations) without affecting any other entries in the TLB.

15. In a data processing system as defined in claim 14, the CP further comprising:
   means in the IE for requesting a fetch of a state descriptor (SD) at a real address in MS designated by the SIE instruction being executed by the IE,
   loading means in the CP for setting the states of the guest mode bistable means, a preferred guest mode bistable, means control registers, general registers, local storage, and program status word registers according to information in predetermined fields in the SD.

16. In a data processing system as defined in claim 15, the loading means further comprising:
   means for setting an architecture type bistable device according to a field in the state descriptor to determine the architecture for a guest virtual machine being prepared for execution on the host machine,
   whereby the guest virtual machine may operate by a different architecture from the host machine.

17. In a data processing system as defined in claim 16, the CP further comprising:
   interruption detection means for resetting the guest mode bistable device to native mode state,
   whereby the guest program ceases execution and the host program again begins execution.

18. In a data processing system as defined in claim 16, the CP further comprising:
   interception detection means for resetting the guest mode bistable device to native mode state,
   whereby the guest program ceases execution and the host program again beings execution.

19. In a data processing system as defined in claim 8, the CP further comprising:
   the STO selection means selecting the host STO registering means in response to the preferred guest type indicating bistable device being set to indicate a preferred guest is currently executing in the CP,
   means for connecting the host STO registering means to the hardware adder translation means for translating preferred guest storage requests,
   whereby the preferred guest uses the host STO registering means.

20. In a data processing system as defined in claim 6 or 1, the CP further comprising:
   SIE instruction execution means invoking microcode for fetching a state descriptor in main storage to determine if accelerated guest conditions exist for permitting concurrent use by host and guest of the hardware TLB,
   an accelerated mode trigger being set by the SIE instruction execution means from a field in the state descriptor for an accelerated guest determination to enable the SIE instruction execution means to have concurrent use of hardware TLB for both host and guest.

21. In a data processing system as defined in claim 20, the CP further comprising:
   limit registering means being enabled by the set state of the accelerated mode trigger for receiving an upper limit main storage address as the upper boundary allocated in real storage to an accelerated guest,
   means for comparing each translated address requested by the accelerated guest with the upper limit main storage address in the limit registering means,
   means for generating an addressing exception signal when the translated address is greater than the upper limit main storage address,
   whereby limit checking is executed for accelerated guest translated addresses with no CP performance degradation caused by either the limit checking or accelerated guest address translation.

22. In a data processing system as defined in claim 1, each CP in the system further comprising:
   prefix registering means in the CP for receiving host and guest prefix values,
   means for executing a SIE (start interpretive execution) instruction to set the CP state of the mode indicating means to guest state, a state descriptor field in main storage associated with each SIE instruction,
   means for moving into the prefix registering means a guest prefix value from a state descriptor field for the guest in main storage when the host control program executes a SIE instruction,
   means for controlling the CP while the mode indicating means is set to indicate a guest state to apply the guest prefix value to real addresses obtained by the CP,
   whereby the transfer of host control to guest control over a CP is performed by a host control program invoking a guest control program with execution of the SIE instruction regardless of whether the CP is in a uniprocessor or multiprocessor system.

23. In a data processing system as defined in claim 22, the mode indicating means further comprising:

an accelerated mode trigger set to an accelerated guest state only if the SIE instruction executing means accesses a preferred guest indicating field in the state descriptor of the SIE instruction.

24. In a data processing system as defined in claim 11, 12, 14, 22 or 23, the system further comprising:

a plurality of CPs (central processors) to provide a multiprocessing system, means connecting the plurality of CPs to main storage, whereby any guest program may be executed on any CP in the multiprocessing system.

25. In a data processing system as defined in claim 22, the CP further comprising:

means for setting the state of the mode indicating means to indicate the host state in response to a signal for an I/O interruption, or a predetermined CP interruption not to be handled by the guest control program, means for again controlling the CP address prefix by applying the host prefix value in the prefix registering means in response to the setting means causing the mode indicating means to indicate the host control program is controlling the CP, whereby the guest control program is interruptable for operations by the host control program, which may later invoke the same or another control program by executing a SIE instruction.

* * * * *